United States Patent
Kim et al.

(10) Patent No.: US 10,314,030 B2
(45) Date of Patent: Jun. 4, 2019

(54) METHOD AND APPARATUS FOR TRANSMITTING AND RECEIVING DATA USING PLURALITY OF CARRIERS IN MOBILE COMMUNICATION SYSTEM

(71) Applicant: Samsung Electronics Co., Ltd, Gyeonggi-do (KR)

(72) Inventors: Soenghun Kim, Gyeonggi-do (KR); Gert Jan Van Lieshout, Apeldoorn (NL); Kyeongin Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/865,011

(22) Filed: Jan. 8, 2018

(65) Prior Publication Data

US 2018/0132216 A1 May 10, 2018

Related U.S. Application Data

(63) Continuation of application No. 14/879,033, filed on Oct. 8, 2015, now Pat. No. 9,867,177, which is a (Continued)

(30) Foreign Application Priority Data

Sep. 27, 2013 (KR) .................. 10-2013-0115621
Jan. 29, 2014 (KR) .................. 10-2014-0011659

(51) Int. Cl.
*H04W 36/08* (2009.01)
*H04W 72/04* (2009.01)
(Continued)

(52) U.S. Cl.
CPC .......... *H04W 72/042* (2013.01); *H04L 5/001* (2013.01); *H04W 16/24* (2013.01); *H04W 24/10* (2013.01); *H04W 36/08* (2013.01); *H04W 72/0453* (2013.01); *H04W 76/15* (2018.02); *H04W 76/27* (2018.02); *H04W 84/042* (2013.01)

(58) Field of Classification Search
CPC . H04W 72/042; H04W 24/10; H04W 76/046; H04W 84/042; H04W 16/24
See application file for complete search history.

(56) References Cited

U.S. PATENT DOCUMENTS

| | | | |
|---|---|---|---|
| 2010/0118720 A1 | 5/2010 | Gauvreau et al. | |
| 2010/0167779 A1 | 7/2010 | Kapoor et al. | |
| (Continued) | | | |

FOREIGN PATENT DOCUMENTS

| | | |
|---|---|---|
| CN | 102918914 A | 2/2013 |
| EP | 2448325 A1 | 5/2012 |
| (Continued) | | |

OTHER PUBLICATIONS

International Search Report dated Dec. 19, 2014 in connection with International Patent Application No. PCT/KR2014/009061, 7 pages.
(Continued)

*Primary Examiner* — Chi Ho A Lee

(57) ABSTRACT

The present specification discloses a mobile communication system. More particularly, the present invention relates to a method and an apparatus for transmitting and receiving data using a plurality of carriers in a mobile communication system.

12 Claims, 17 Drawing Sheets

Related U.S. Application Data continuation of application No. 14/782,991, filed as application No. PCT/KR2014/009061 on Sep. 26, 2014, now Pat. No. 9,769,816.

(51) Int. Cl.

| | |
|---|---|
| *H04L 5/00* | (2006.01) |
| *H04W 16/24* | (2009.01) |
| *H04W 24/10* | (2009.01) |
| *H04W 76/27* | (2018.01) |
| *H04W 76/15* | (2018.01) |
| *H04W 84/04* | (2009.01) |

(56) References Cited

U.S. PATENT DOCUMENTS

| | | |
|---|---|---|
| 2010/0222059 A1 | 9/2010 | Pani et al. |
| 2011/0134774 A1 | 6/2011 | Pelletier et al. |
| 2011/0158118 A1 | 6/2011 | Chou et al. |
| 2011/0250894 A1 | 10/2011 | Kunugi et al. |
| 2012/0008776 A1 | 1/2012 | Ishida et al. |
| 2012/0106510 A1 | 5/2012 | Kuo |
| 2012/0281548 A1 | 11/2012 | Lin et al. |
| 2013/0034018 A1 | 2/2013 | Wei |
| 2013/0039314 A1 | 2/2013 | Prateek et al. |
| 2014/0056243 A1 | 2/2014 | Pelletier et al. |
| 2014/0153436 A1 | 6/2014 | Matsuo et al. |
| 2014/0286243 A1 | 9/2014 | Yamada |
| 2015/0043492 A1 | 2/2015 | Baek et al. |
| 2015/0139192 A1 | 5/2015 | Zhang et al. |
| 2015/0181470 A1 | 6/2015 | Chai et al. |
| 2015/0208308 A1 | 7/2015 | Watanabe et al. |
| 2015/0264631 A1 | 9/2015 | Zhang et al. |
| 2015/0282238 A1 | 10/2015 | Aminaka et al. |
| 2015/0304911 A1 | 10/2015 | Wang et al. |
| 2015/0334767 A1 | 11/2015 | Chien et al. |
| 2015/0365993 A1 | 12/2015 | Aminaka et al. |
| 2016/0050652 A1 | 2/2016 | Wu et al. |
| 2016/0088524 A1 | 3/2016 | Pani et al. |
| 2016/0143003 A1 | 5/2016 | Yi et al. |
| 2016/0174124 A1 | 6/2016 | Basu Mallick et al. |
| 2016/0183151 A1 | 6/2016 | Wu |
| 2016/0192245 A1 | 6/2016 | He et al. |
| 2016/0198390 A1 | 7/2016 | Aminaka et al. |
| 2016/0219603 A1 | 7/2016 | Fujishiro et al. |
| 2016/0255583 A1 | 9/2016 | Takeda et al. |
| 2016/0295440 A1 | 10/2016 | Lee et al. |
| 2016/0345198 A1 | 11/2016 | Lee et al. |

FOREIGN PATENT DOCUMENTS

| | | |
|---|---|---|
| KR | 1020110030596 A | 3/2011 |
| KR | 1020110050685 A | 5/2011 |
| KR | 1020110084968 A | 7/2011 |
| KR | 1020120094496 A | 8/2012 |
| KR | 1020130033371 A | 4/2013 |
| WO | 2013104416 A1 | 7/2013 |
| WO | 2014-147929 A1 | 9/2014 |

OTHER PUBLICATIONS

Extended European Search Report dated Apr. 19, 2016 in connection with European Application No. 14848342.3, 13 pages.

Samsung, "Discussion on Inter-ENS Carrier Aggregation", 3GPP TSG-RAN WG2 Meeting #82, R2-131833, May 20-24, 2013, Fukuoka, Japan, 5 pages.

LG Electronics Inc., "Connectivity Models for Samll Cell Enhancement", 3GPP TSG-RAN WG2 #81, R2-130314, St. Julian's, Malta, Jan. 28-Feb. 1, 2013, 8 pages.

Communication from a foreign patent office in a counterpart foreign application, State Intellectual Property Office, Application No. CN 201480026077.4, dated Apr. 10, 2018, 21 pages.

Communication from a foreign patent office in a counterpart foreign application, European Patent Office, Application No. EP 18164207.5, dated Jun. 5, 2018, 7 pages.

US 10,314,030 B2

METHOD AND APPARATUS FOR TRANSMITTING AND RECEIVING DATA USING PLURALITY OF CARRIERS IN MOBILE COMMUNICATION SYSTEM

The present application is a continuation of U.S. patent application Ser. No. 14/879,033 filed on Oct. 8, 2015, which is a continuation of U.S. patent application Ser. No. 14/782, 991 filed on Oct. 7, 2015, which is a national stage of International Patent Application No. PCT/KR2014/009061 filed Sep. 26, 2014, entitled "METHOD AND APPARATUS FOR TRANSMITTING AND RECEIVING DATA USING PLURALITY OF CARRIERS IN MOBILE COMMUNICATION SYSTEM", and, through International Patent Application No. PCT/KR2014/009061, claims the benefit of Korean Patent Application No. 10-2013-0115621 filed Sep. 27, 2013, and Korean Patent Application No. 10-2014-0011659 filed Jan. 29, 2014, all of which are incorporated herein by reference into the present disclosure as if fully set forth herein.

TECHNICAL FIELD

The present disclosure relates to a mobile communication system and, more particularly, to a method and an apparatus for transmitting and receiving data by using a plurality of carriers in a mobile communication system.

BACKGROUND ART

In general, mobile communication systems have been developed to provide communication while securing mobility of users. With the rapid development of technologies, the mobile communication systems have reached a stage of providing high-speed data communication services as well as voice communication.

Currently, a standardization operation for a Long Term Evolution (LTE) system is being progressed as one of the next generation mobile communication systems by the 3rd Generation Partnership Project (3GPP). The LTE system corresponds to a technology, which implements high speed packet-based communication having a maximum transmission rate of 100 Mbps, which is faster than a data transmission rate currently provided, and its standardization has been almost completed.

Recently, discussion about an evolved LTE communication system (LTE-A), in which various new technologies are grafted into the LTE communication system to increase a transmission rate, is progressed in earnest. A representative of the newly introduced technologies may be carrier aggregation. The carrier aggregation uses a plurality of forward carriers and a plurality of backward carriers by one UE (User Equipment) unlike the conventional data transmission/reception using only one forward carrier and one backward carrier by the UE.

The current LTE-A defines only intra-ENB (Evolved NodeB) carrier aggregation. This results in reducing an application possibility of a carrier aggregation function. Particularly, in a scenario overlappingly operating a plurality of pico cells and one micro cell, the macro cell and the pico cells may not be aggregated.

DISCLOSURE OF INVENTION

Technical Problem

An embodiment of the present specification has been made to solve at least some of the above problems, and an object of the present specification is to provide a method and an apparatus for inter-ENB carrier aggregation.

Solution to Problem

For the above described purpose, in accordance with an aspect of the present invention, a method of transmitting/receiving data in a mobile communication system using a plurality of cells by a UE (User Equipment) is provided. The method includes: performing data communication with a first serving cell through a first MAC (Medium Access Control); receiving a control message instructing to add a second serving cell from the first serving cell; setting a second MAC according to second MAC configuration information included in the control message; and performing data communication with the second serving cell through the second MAC.

In accordance with another aspect of the present invention, a UE (User Equipment) for performing communication by using a plurality of cells controlled by a plurality of ENBs (Evolved NodeBs) is provided. The UE includes: a transceiver for performing data communication; and a controller for performing data communication with a first serving cell through a first MAC (Medium Access Control), receiving a control message instructing to add a second serving cell from the first serving cell, setting a second MAC according to second MAC configuration information included in the control message, and performing data communication with the second serving cell through the second MAC.

Advantageous Effects of Invention

According to an embodiment of the present specification, it is possible to increase a UE transmission/reception rate through carrier aggregation between different ENBs.

MODE FOR THE INVENTION

In the following description, a detailed description of known configurations or functions incorporated herein will be omitted when it is determined that the detailed description makes the subject matter of the present disclosure unclear.

Hereinafter, embodiments of the present disclosure will be described with reference to the accompanying drawings. Prior to the description of the present specification, an LTE system and carrier aggregation will be briefly described.

[First Embodiment]

Figure 1:
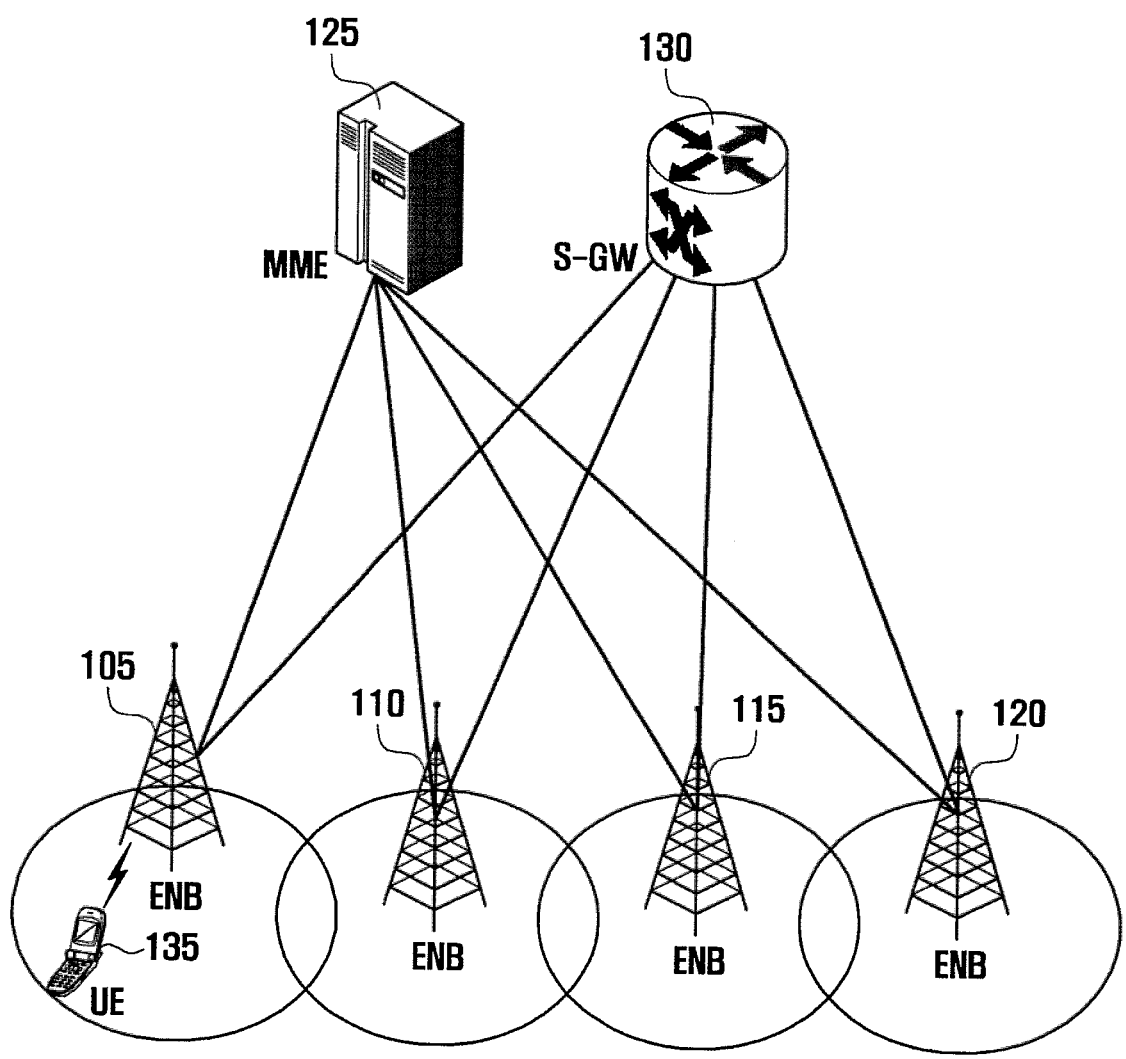
FIG. 1 illustrates a structure of an LTE system to which some embodiments of the present specification are applied.

FIG. 1 illustrates a structure of an LTE system to which some embodiments of the present specification are applied.

Referring to FIG. 1, a radio access network of the LTE system includes one or more next generation Evolved Node Bs (hereinafter, referred to as ENBs, Node Bs, or base stations) 105, 110, 115 and 120, an MME (Mobility Management Entity) 125, and a S-GW (Serving-Gateway) 130. A User Equipment (hereinafter, referred to as a UE or a terminal) 135 accesses an external network through the ENB 105, 110, 115, or 120 and the S-GW 130.

In FIG. 1, the ENBs 105, 110, 115, and 120 correspond to the existing node Bs of the UMTS system. The ENBs 105, 110, 115, and 120 are connected to the UE 135 through radio channels and perform a more complex function compared to the existing node B. In the LTE system, since all user traffic including a real time service such as a VoIP (Voice over IP) through an Internet protocol are serviced through a shared channel, a device for collecting and scheduling status information on buffer statuses of UEs 135, available transmission power statuses, and channel statuses is required, and the ENBs 105, 110, 115, and 120 serve as this device. One of the ENBs 105, 110, 115, and 120 generally controls a plurality of cells. In order to implement a transmission rate of 100 Mbps, the LTE system uses an Orthogonal Frequency Division Multiplexing (OFDM) as a wireless access technology in a bandwidth of 20 MHz. Further, an Adaptive Modulation and Coding (hereinafter, referred to as an AMC) scheme for determining a modulation scheme and a channel coding rate is applied to the LTE system in accordance with a channel status of the UE 135. The S-GW 130 is a device for providing a data bearer, and generates or removes the data bearer under a control of the MME 125. The MME 125 is a device performing various types of control as well as a mobility management function, and is connected to the plurality of ENBs 105, 110, 115, and 120.

Figure 2:
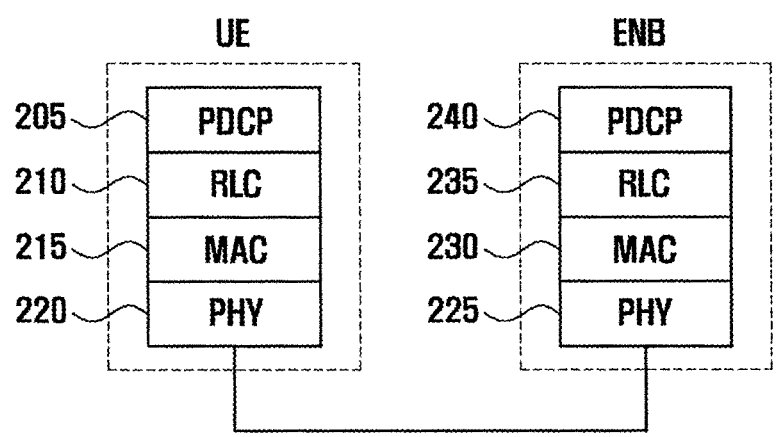
FIG. 2 is a view illustrating a wireless protocol structure in the LTE system to which some embodiments of the present specification are applied.

FIG. 2 is a view illustrating a wireless protocol structure in the LTE system to which some embodiments of the present specification are applied.

Referring to FIG. 2, the UE and the ENB include PDCPs (Packet Data Convergence Protocols) 205 and 240, RLCs (Radio Link Controls) 210 and 235, Medium Access Controls (MACs) 215 and 230, respectively, in the wireless protocol of the LTE system. The PDCPs 205 and 240 perform an operation for compressing/reconstructing an IP header, and the RLCs 210 and 235 perform an ARQ operation by reconfiguring a PDCP PDU (Packet Data Unit) to have a proper size. The MACs 215 and 230 are connected with various RLC layer devices included in one UE, and perform an operation for multiplexing RLC PDUs to the MAC PDU and de-multiplexing the RLC PDUs from the MAC PDU. The PHY layers 220 and 225 perform an operation for channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 3:
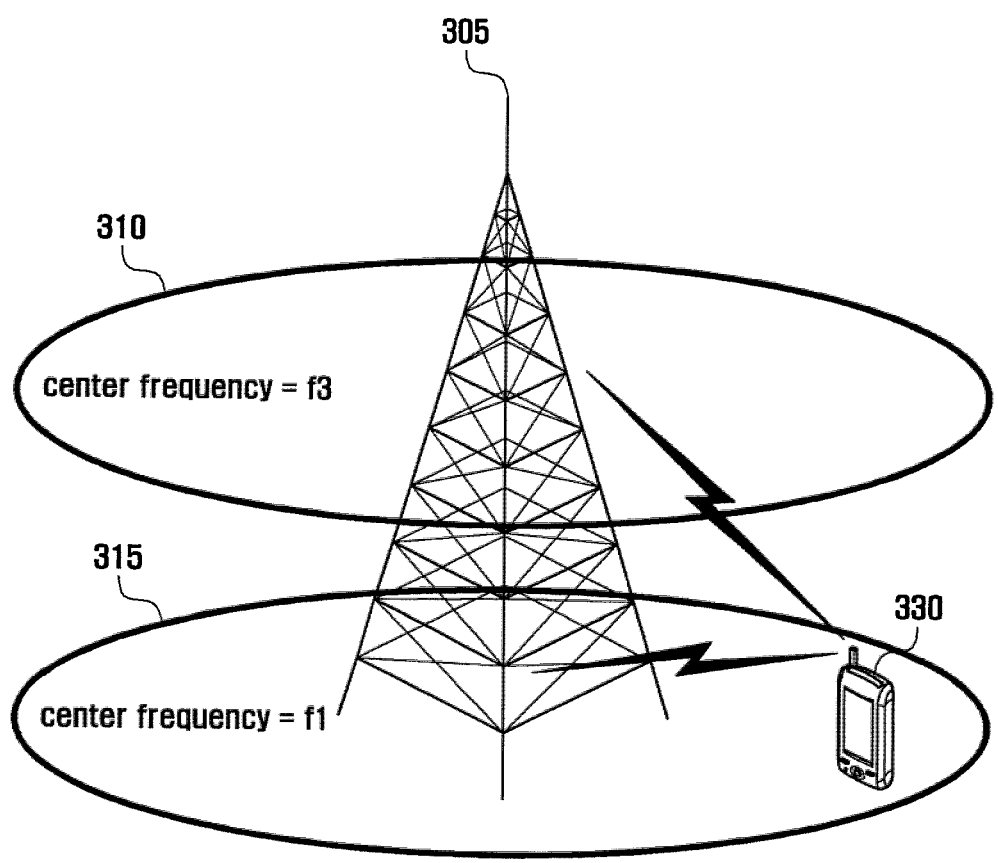
FIG. 3 is a view illustrating intra-ENB carrier aggregation to which some embodiments of the present specification are applied.

FIG. 3 is a view illustrating intra-ENB carrier aggregation to which some embodiments of the present specification are applied.

Referring to FIG. 3, one ENB generally transmits and receives multiple carriers over several frequency bands. For example, when an ENB 305 transmits a carrier 315 of a forward center frequency f1 and a carrier 310 of a forward center frequency f3, one UE would transmit/receive data by using one of the two carriers in the prior art. However, the UE having a carrier aggregation capability can simultaneously transmit/receive data through a plurality of carriers. The ENB 305 may allocate many more carriers to the UE 330 with the carrier aggregation capability according to circumstances, thereby improving the transmission rate of the UE 330. As described above, aggregation of forward carriers and backward carriers transmitted and received by one ENB refers to intra-ENB carrier aggregation. However, according to the circumstances, it may be required to aggregate forward carriers and backward carriers transmitted and received by different ENBs unlike the one ENB illustrated in FIG. 3.

Figure 4:
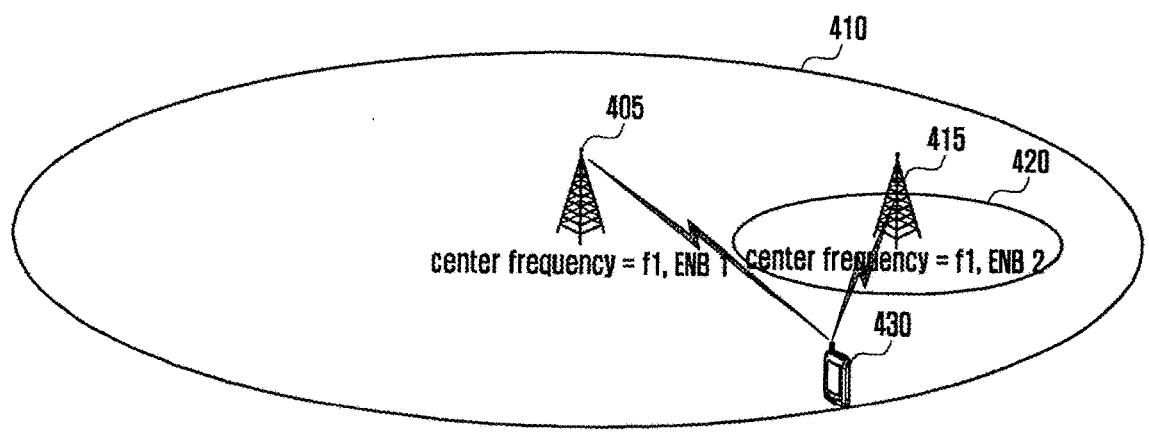
FIG. 4 illustrates a carrier aggregation scheme according to an embodiment of the present specification.

FIG. 4 illustrates a carrier aggregation scheme according to an embodiment of the present specification. More specifically, FIG. 4 illustrates inter-ENB carrier aggregation as a carrier aggregation scheme.

Referring to FIG. 4, ENB #1 405 transmits/receives a carrier of a center frequency f1 and ENB #2 420 transmits/receives a carrier of a center frequency f2. At this time, aggregation (combination) of the carrier of the forward center frequency f1 and the carrier of the forward center frequency f2 by a UE 430 refers to aggregation of carriers transmitted/received from two or more ENBs by one UE. In the present specification, the aggregation is named inter-ENB carrier aggregation (or inter-ENB CA).

The terms, which are frequently used in the present specification, will be described below.

When one forward carrier transmitted by one ENB and one backward carrier received by the ENB configure one cell, a traditional meaning of carrier aggregation may be understood as the UE transmitting/receiving data through a plurality of cells at the same time. Accordingly, a maximum transmission rate increases in proportion to the number of aggregated carriers.

In the following description of the present specification, receiving data through a predetermined forward carrier or transmitting data through a predetermined backward carrier by the UE may have the same meaning as transmitting/receiving data through a center frequency, which characterizes the carrier, and a control channel and a data channel, which are provided by a cell corresponding to a frequency band. In the present specification, particularly, the carrier aggregation is expressed by the phrase "a plurality of serving cells are set" and, with respect to the serving cell, the terms a primary serving cell (hereinafter, reference to as a PCell) and a secondary serving cell (hereinafter, referred to as an SCell), or an activated serving cell will be used. The terms have the meanings as they are used in the LTE mobile communication system. In the present invention, the terms carrier, component carrier, and serving cell are interchangeably used.

The present specification defines a set of serving cells controlled by the same ENB as a CA group (Carrier Aggregation Group: CAG). A serving cell group is divided into a primary CA group (Primary Carrier Aggregation Group: PCAG) and a secondary CA group (Secondary Carrier Aggregation Group: SCAG). The PCAG refers to a set of serving cells controlled by an ENB that controls the PCell (hereinafter, referred to as a master ENB: MeNB) and the SCAG refers to a set of serving cells controlled by an ENB, which is not the ENB controlling the PCell, that is, an ENB that controls only SCells (hereinafter, referred to as a slave ENB: SeNB). Whether a predetermined serving cell belongs to the PCAG or the SCAG is determined by the ENB during a process of setting the corresponding serving cell. One PCAG or one or more SCAGs may be set to one UE. The present invention considers only a case where one SCAG is set for convenience of the description. However, even if one or more SCAGs are set, the content of the present invention can be applied without any omissions or rewrites. In the embodiment of FIG. 4, when ENB #1 405 corresponds to the MeNB and ENB #2 415 corresponds to the SeNB, a serving cell 410 of the center frequency f1 is the serving cell belonging to the PCAG and a serving cell 420 of the center frequency f2 is the serving cell belonging to the SCAG.

In the following description, other terms may replace the PCAG and the SCAG for understanding. For example, with respect to the PCAG and the SCAG, a primary set and a secondary set may be used, respectively, or a primary carrier group or a secondary carrier group may be used, respectively. However, in this case, it should be noted that the meanings are equal even though the terms are different. A main purpose of the terms is to distinguish whether any cell is controlled by an ENB that controls the PCell of a particular UE or controlled by an ENB that controls the Scell of the particular UE. Operation types of the UE and the corresponding cell may vary depending on a case where the cell is controlled by the ENB that controls the PCell of the particular UE and a case where the cell is controlled by the ENB that controls the PCell.

Since schedulers are provided in the unit of ENBs, it is not easy to perform scheduling such that transmission resources of a plurality of ENBs do not overlap each other in real time. Accordingly, the UE to which one or more CAGs are set is controlled by one or more schedulers. Further, different ENBs independently perform various MAC-related operations. Accordingly, the UE distinguishes serving cells set to the UE according to each CAG and performs differentiated operations according to the CAGs.

As the carrier aggregation is introduced, one UE transmits/receives data through a plurality of serving cells. At this time, the UE includes one MAC device and relays between logical channels set to the UE and serving cells in an active state through the MAC device. In other words, when the MAC device receives a downlink MAC PDU from a predetermined serving cell, the MAC device performs an operation for de-multiplexing the MAC SDU from the MAC PUD and transferring the MAC SDU to a proper logical channel among all logical channels set to the UE, or multiplexing the MAC SDUs transmitted through the logical channels to generate the MAC PDU and then transmitting the MAC PDU through a proper serving cell among all serving cells currently in an active state.

When serving cells aggregated by the UE are controlled by different ENBs rather than the same ENB, that is, in an inter-ENB CA state, it is more efficient for the UE to include a plurality of MAC devices. This is because, when one MAC device is used, whenever the MAC PDU is received or transmitted, the UE should identify the ENB, which controls the serving cell from which the MAC PDU is received or the ENB, which controls the serving cell to which the MAC PDU should be transmitted, and then performs the following operations, which are complicated.

In a setting of a new serving cell by the UE according to an instruction of the ENB, the present invention proposes a method and an apparatus for generating and operating a secondary MAC device (or S-MAC) if the serving cell is a serving cell controlled by an ENB different from the current ENB.

Figure 5:
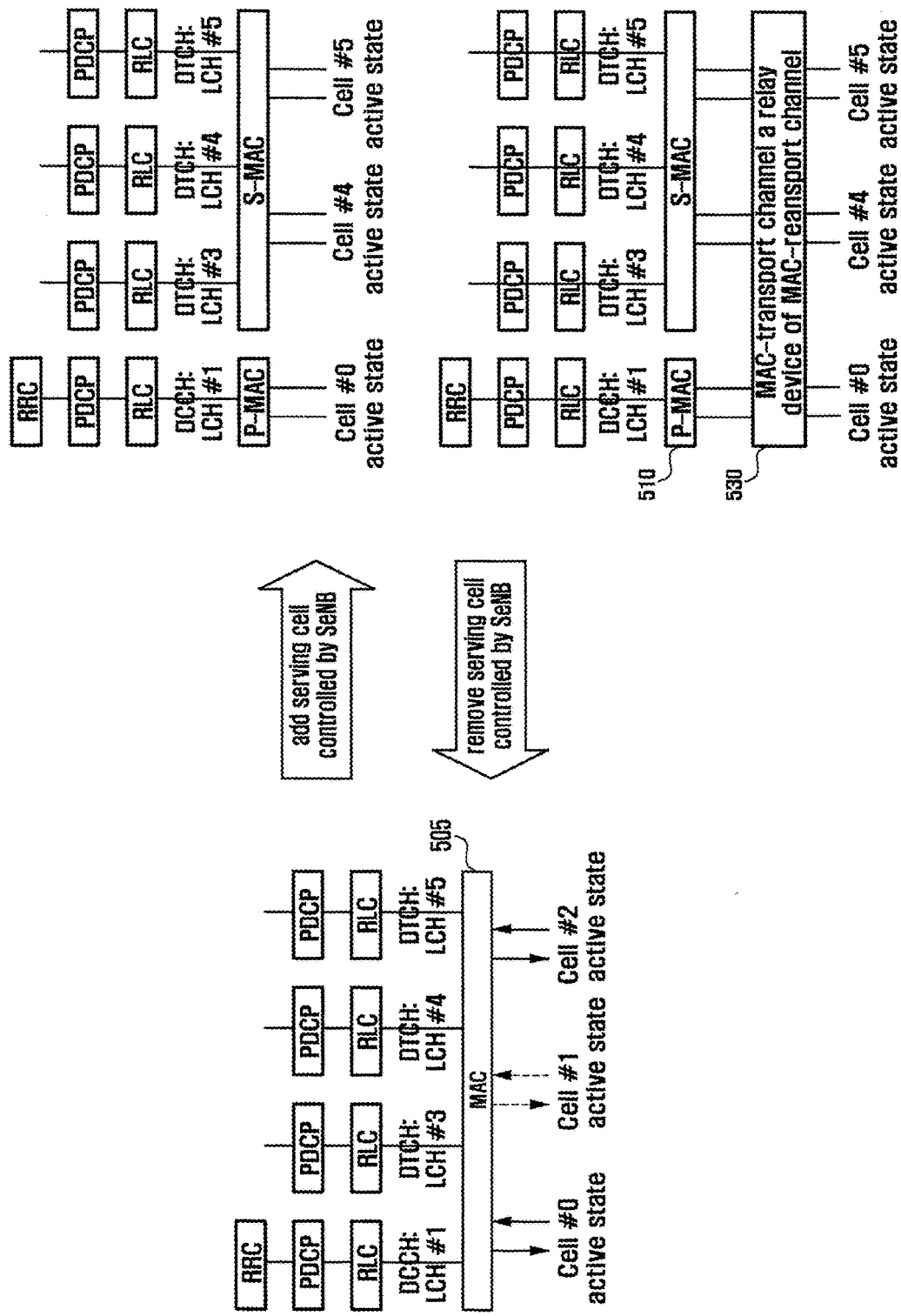
FIG. 5 is a view schematically illustrating a general MAC, P-MAC, and S-MAC.

FIG. 5 is a view schematically illustrating general MAC, P-MAC, and S-MAC.

When carriers are not aggregated or only serving cells controlled by the same ENB are set, the UE includes one MAC device 505 and the MAC device 505 connects logical channels set to the UE and cells in an active state among the serving cells set to the UE. For example, when logical channel #1, logical channel #3, logical channel #4 , and logical channel #5 are set to the UE and serving cell #0, serving cell #1, and serving cell #2 are set to the UE, if serving cell #0 and serving cell #2 are in the active state, the MAC device 505 may connect (relay or map) logical channel #1, logical channel #3, logical channel #4, and logical channel #5, and serving cell #0 and serving cell #2. Among the logical channels, LCH #1 corresponds to a DCCH (Dedicate Control Channel) and the remaining logical channels correspond to DTCHs (Dedicate Traffic Channels). The DCCH is mapped with an SRB (Signaling Radio Bearer), and the DTCH is mapped with a DRB (Data Radio Bearer).

At a predetermined time point, serving cell #2 and serving cell #3 are removed and serving cell #4 and serving cell #5 are newly set. When serving cell #0 is controlled by the MeNB and serving cell #4 and serving cell #5 are controlled by the SeNB, the UE additionally sets the S-MAC according to an instruction of the ENB. A control message for setting serving cell #4 and serving cell #5 is transmitted to the UE from the SeNB in the form of an RRC message. The control message may include information indicating whether the S-MAC is generated, information indicating which logical channel among the logical channels set to the UE is connected to the S-MAC, and information indicating which serving cell is connected to the S-MAC.

For example, when the UE receives, from the ENB, an instruction to connect logical channel #3, logical channel #4, logical channel #5, serving cell #4, and serving cell #5 with the S-MAC, the UE sets serving cell #4 and serving cell #4 and generates an S-MAC 515, and then connects the logical channels with the serving cells. That is, the MAC device is reset as a P-MAC 510 to connect logical channel #1 and serving cell #0, and the S-MAC 515 is set to connect logical channel #3, logical channel #4, logical channel #5, serving cell #4, and serving cell #5.

The connection between the MAC and a predetermined serving cell may be understood as the connection between a physical layer of the serving cell or a transport channel of the serving cell and the MAC. The MAC transmits/receives data through the connected physical layer or transport channel of the serving cell.

Information indicating whether the S-MAC is generated may have various forms. For example, when explicit S-MAC setting information is included, it may be determined that the generation of the S-MAC is instructed. Alternatively, when SCAG setting information is included, it may be determined that the generation of the S-MAC is instructed. Alternatively, when a new serving cell belonging to the SCAG is set to the UE to which only the PCAG serving cell is set, it may be determined that the generation of the S-MAC is instructed.

According to an embodiment of the present invention, instead of the direct connection between the serving cell and the related MAC as described above, the MAC operation may be more simplified by setting a relay device 530 between the MAC and the physical layer or the MAC and the transport channel. As described above, when a separate relay device is provided, with respect to a predetermined transport channel or scheduling assignment, the P-MAC and the S-MAC may operate regardless of the serving cell of the transport channel or the serving cell from which the scheduling assignment is received. The scheduling assignment is scheduling-related control information transmitted/received through a forward control channel (Physical Downlink Control Channel: PDCCH), and corresponds to forward assignment including control information related to forward data reception (forward transmission resources, transport formats, and the like) and backward grant including control information related to backward data transmission (backward transmission resources, transport formats, and the like). Hereinafter, in the present specification, the terms forward and downlink are exchangeably used and the terms backward and uplink are exchangeably used.

For convenience of the description, the MAC device is divided as follows.

General MAC device: corresponds to an MAC device set when carrier aggregation is not set or when the carrier aggregation is set but all of set serving cells are controlled by one ENB (or when the SCAG is not set).

Primary MAC device (P-MAC): corresponds to an MAC device connected to serving cells controlled by the MeNB when one or more MAC devices are set to the UE (that is, when one or more serving cells are set to the UE and the serving cells are controlled by one or more ENBs).

Secondary MAC device (S-MAC): corresponds to an MAC device connected to serving cells controlled by the SeNB when one or more MAC devices are set to the UE (that is, when one or more serving cells are set to the UE and the serving cells are controlled by one or more ENBs).

The general MAC device connects all logical channels set to the UE and serving cells in the active state among all serving cells set to the UE.

The secondary MAC device connects a predetermined logical channel among the logical channels set to the UE and predetermined serving cells among all the serving cells set to the UE. The predetermined serving cells are serving cells controlled by the SeNB and are explicitly indicated by an RRC control message. The predetermined logical channels are logical channels explicitly indicated by an RRC control message.

The primary MAC device connects another predetermined logical channel among the logical channels set to the UE and some other serving cells among all the serving cells set to the UE. Some other serving cells are serving cells controlled by the MeNB and correspond to the remaining serving cells except for the serving cell explicitly indicated by the RRC control message. Some serving cells, for example, the PCell, are always connected to the primary MAC device. The other predetermined logical channels correspond to the remaining logical channel except for the logical channel explicitly indicated by the RRC control message. Further, some logical channels, for example, the DCCH, are always connected to the primary MAC device.

The connection between predetermined logical channels and predetermined serving cells (or transport channels mapped with the serving cells) means that data received through the serving cells is always transferred to the logical channels and data generated in the logical channels is always transmitted through the serving cells.

The serving cells may include downlink and uplink, and the downlink may be expressed as a DL-SCH (Downlink Shared Channel) and the uplink may be expressed as a UL-SCH (Uplink Shared Channel). Accordingly, for example, an arrow 520 expressing the uplink of serving cell #0 indicates the UL-SCH of serving cell #0, and an arrow 525 expressing the downlink of serving cell #5 indicates the DL-SCH of serving cell #5.

Figure 6:
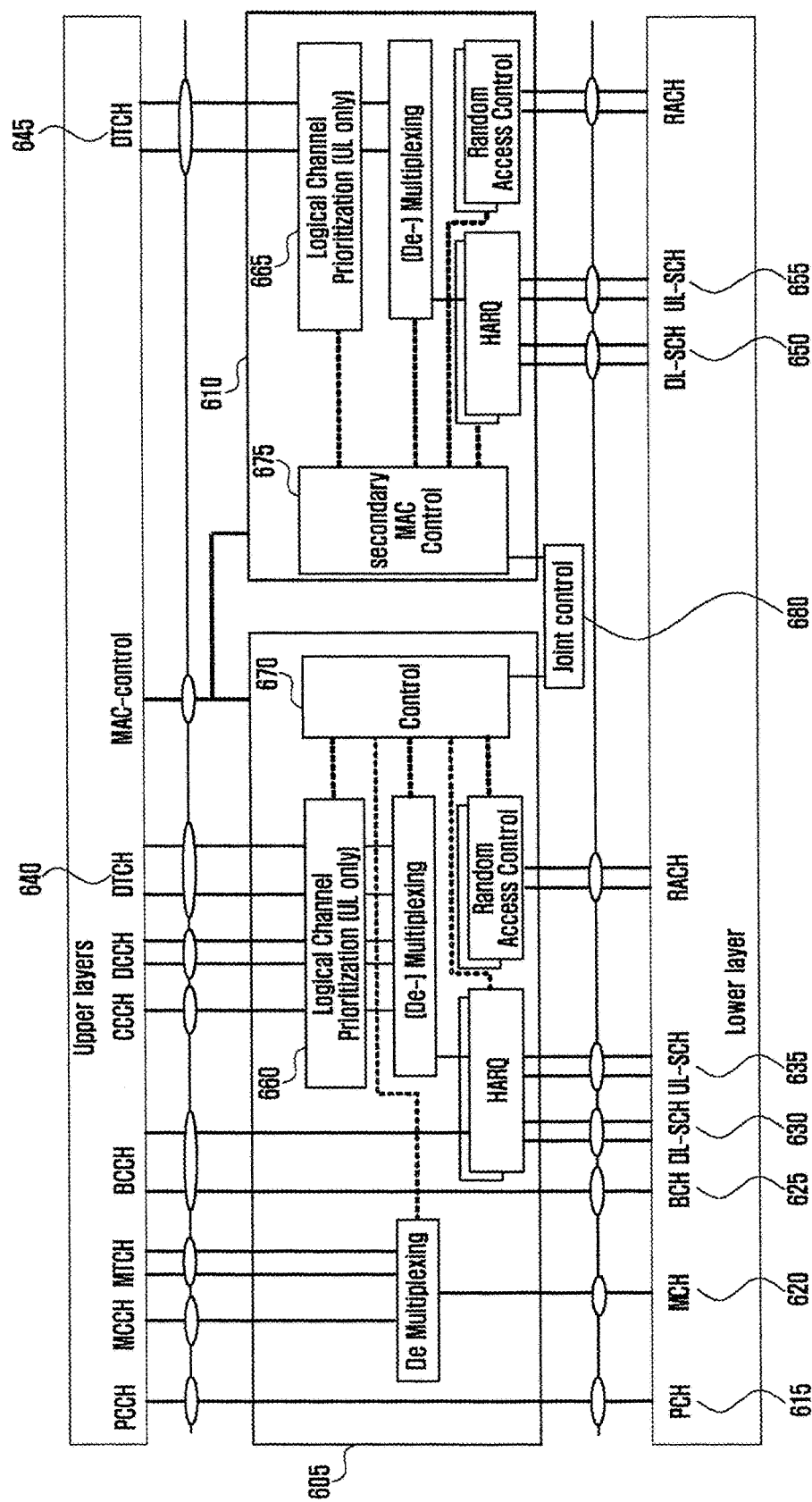
FIG. 6 is a view illustrating the P-MAC and the S-MAC in more detail.

FIG. 6 is a view illustrating the P-MAC and the S-MAC in more detail.

The logical channel is a logical channel between the MAC and an RLC layer device, and the transport channel is a channel between the MAC and the PHY. The logical channel specifies the RLC device which the MAC SDU is received from and the RLC device which the MAC SDU should be transmitted to, which is determined according to characteristics of the data. The transport channel is a channel defined according to how data should be processed in wireless radio.

Types of the logical channel include a PCCH (Paging Control Channel by which a paging message is received), an MCCH (Multicast Control Channel by which control information related to an MBMS service is received), an MTCH (Multicast Traffic Channel by which traffic related to the MBMS service is received), a BCCH (Broadcast Control Channel by which system information is received), a CCCH (Common Control Channel by which an RRC control message is transmitted/received before an RRC connection is configured and, more specifically, an RRC CONNECTION REQUEST, an RRC CONNECTION REESTABLISHMENT REQUEST, an RRC CONNECTION REESTABLISHMENT message are transmitted/received), a DCCH (Dedicate Control Channel by which a general RRC control message is transmitted/received), and a DTCH (Dedicate Traffic Channel by which user traffic is transmitted/received).

Types of the transport channel include a BCH (Broadcast Channel by which a master information block of system information is received), a DL-SCH (Downlink Shared Channel by which general data is received, and one DL-SCH corresponds to downlink of one serving cell), a PCH (Paging Channel by which a paging message is received), a UL-SCH (Uplink Shared Channel by which general data is transmitted, and one UL-SCH correspond to uplink of one serving cell), an RACH (Random Access Channel by which random access preamble is transmitted), and an MCH (Mulitcast Channel by which MBMS control information and data are received).

All the types of transport channel and all the types of logical channel are connected through a P-MAC 605, and a predetermined transport channel and a predetermined logical channel are connected through an S-MAC 610.

The P-MAC 605 connects a PCH 615 with the PCCH, and the PCH 615 corresponds to a PCH of the PCell. The P-MAC 605 connects an MCH 620 with the MCCH and the MTCH, and the MCH 620 may be received from all serving cells belonging to the PCAG including the PCell. The P-MAC 605 connects a BCH 625 and the BCCH, and the BCH 630 corresponds to a BCH of the PCell. The P-MAC 605 connects one or more DL-SCHs 630 with the BCCH, CCCH, DCCH, or DTCH. The DL-SCH 630 connected with the BCCH and the CCCH corresponds to a DL-SCH of the PCell. The DCCH or the DTCH are connected to the DL-SCHs 630 of all serving cells belonging to the PCAG. The P-MAC 650 connects one or more UL-SCHs 635 with the CCCH, DCCH, or DTCH. The UL-SCH 635 connected with the CCCH corresponds to a UL-SCH of the PCell. The DCCH or the DTCH are connected to the UL-SCHs 635 of all serving cells belonging to the PCAG. The P-MAC 605 transmits a random access preamble through an RACH. At this time, the RACH is an RACH of the serving cell belonging to the PCAG. The DTCH 640 connected to the P-MAC 605 may be a part of the DTCHs set to the UE, and the DTCH, which should be connected to the P-MAC 605, is indicated through the RRC control message. Hereinafter, for convenience of the description, the DTCH 640 connected to the P-MAC 605 is named a P-MAC DTCH or a P-MAC DRB.

The S-MAC 610 connects one or more DL-SCHs 650 with the DTCH. The DL-SCHs 650 correspond to DL-SCHs of the serving cells belonging to the SCAG. The S-MAC 610 connects one or more UL-SCHs 655 with the DTCH. The UL-SCHs 655 correspond to UL-SCHs of the serving cells belonging to the SCAG. The S-MAC 610 may transmit a random access preamble through an RACH. The RACH is an RACH of the serving cell belonging to the SCAG. The DTCH 645 connected to the S-MAC 610 may be a part of all the DTCHs set to the UE, and the DTCH, which should be connected to the S-MAC 610, is indicated through the RRC control message. Hereinafter, for convenience of the description, the DTCH 645 connected to the S-MAC 610 is named an S-MAC DTCH or an S-MAC DRB.

A multiplexing/de-multiplexing device multiplexes the MAC SDU to the MAC PDU or de-multiplexes the MAC SDU from the MAC PDU by using an LCID of an MAC header. When backward transmission resources are allocated to the UL-SCH 635 connected to the P-MAC 605 (or when backward grant for the PCAG serving cell can be used), a logical channel prioritization device 660 of the P-MAC 605 determines which data will be transmitted between data generated by the CCCH, DCCH, and DTCH 640 connected to the P-MAC 605 and MAC CEs (Control Elements) generated by a control device 670 of P-TAG.

When backward transmission resources are allocated to the UL-SCH 655 connected to the S-MAC 610 (or when backward grant for the SCAG serving cell can be used), a logical channel prioritization device 665 of the S-MAC 610 determines which data will be transmitted between data generated by the DTCH 645 connected to the S-MAC 610 and MAC CEs generated by an S-MAC control device 675. The MAC CE (Control Element) is a control message generated and processed by the MAC layer, and mainly corresponds to control information related to an MAC function, for example, a buffer status report. The standard 36.322 explains the MAC CE in detail.

A joint controller 680 corresponds to a device that makes a control when cooperation between the P-MAC 605 and the S-MAC 610 is needed or an operation should be performed in consideration of states of both the P-MAC 605 and the S-MAC 610.

Mapping between the logical channel and the transport channel will be described below in more detail and the P-MAC and the S-MAC support the mapping as shown in Table 6 below.

TABLE 6

| Available mapping | P-MAC | S-MAC |
|---|---|---|
| Mapping between MTCH/MCCH and MCH | Support all available mappings | Support or no support according to configuration of UE |
| Mapping between PCCH and PCH | | Support |
| Mapping between BCCH and BCH | | no support |
| Mapping between BCCH and DL-SCH | | Support |
| Mapping between DTCH and DL-SCH | | no support |
| Mapping between DCCH and DL-SCH | | |
| Mapping between CCCH and UL-SCH | | |
| Mapping between DTCH and UL-SCH | | |
| Mapping between DCCH and UL-SCH | | |
| Mapping between CCCH and UL-SCH | | |

As shown in Table 6, while the P-MAC support all available mapping combinations, the S-MAC supports at least two of mapping between the DTCH and the DL-SCH, mapping between the DTCH and the UL-SCH, mapping between the MTCH/MCCH and the MCH, mapping between the PCCH and the PCH, mapping between the BCCH and the BCH, and mapping between the BCCH and the DL-SCH and does not support mapping between the CCCH and the DL-SCH and mapping between the CCCH and the UL-SCH.

Figure 7:
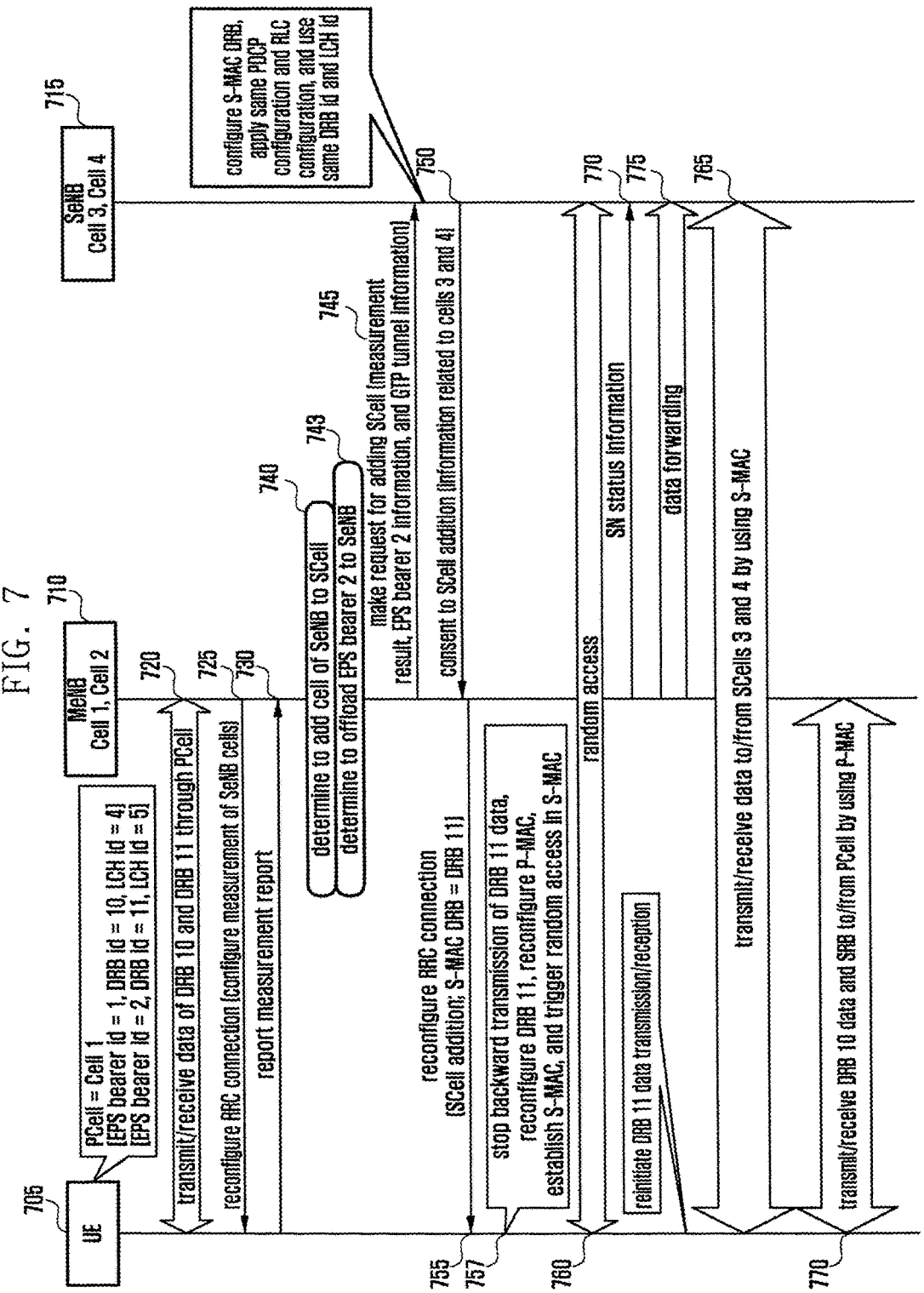
FIG. 7 is a view illustrating a process for setting the S-MAC.

FIG. 7 is a view illustrating a process for setting the S-MAC.

In a mobile communication system including a UE 705, an MeNB 710, and an SeNB 715, cell 1 and cell 2 are controlled by the MeNB 710 and cell 3 and cell 4 are controlled by the SeNB 715. The PCell of the UE 705 corresponds to cell 1, and two EPS bearers are set to the UE 705. EPS bearer 1 has a DRB identification (hereinafter, referred to as a DRB id) of 10 and a logical channel identification (hereinafter, referred to as a LCH id) of 4, and provides a real time service sensitive to a delay, for example, a VoIP service. EPS bearer 2 has a DRB id of 11 and an LCH id of 5, and provides a service including transmission/reception of a large amount of data, for example, a file download service.

The UE 705 transmits/receives data of DRB 10 and DRB 11 through the PCell in step 720. The SRB is also set to the UE 705, and the UE 705 transmits/receives data of the SRB through the PCell. The EPS (Enhanced Packet System) bearer corresponds to a bearer mapped with the DRB, and may be understood as a higher layer than the DRB and formed between the UE 705 and a gateway of the LTE network.

The MeNB 710 instructs the UE to measure cell 3 or cell 4 to additionally set the serving cell in step 725. The UE 705 having measured the instructed cell inserts a measurement result into a predetermined RRC control message to report the result to the MeNB 710 when channel quality of the cell meets a predetermined condition in step 730. The MeNB 710 may instruct a frequency to be measured, instead of directly instructing the cell to be measured. That is, the MeNB 710 may instruct the UE 705 to measure the frequency of cell 3 or cell 4 in step 725. A measurement result report is inserted into a predetermined RRC control message and transmitted. A predetermined condition for triggering the measurement result report may include, for example, a condition where channel quality of a neighboring cell of the frequency instructed to be measured remains in a state better than a predetermined reference for a predetermined period or a condition where channel quality of a neighboring cell of the frequency instructed to be measured remains in a state better than the channel quality of the PCell by a predetermined reference or more for a predetermined period.

The MeNB 710 determines to add the cell of the SeNB 715 to the SCell based on the measurement result report transmitted by the UE 705 in step 740, and determine to transmit/receive data of EPS bearer 2 in the added SCell in step 743.

The MeNB 710 transmits a control message making a request for adding the SCell to the SeNB 715 in step 745. At least some of the information in Table 1 may be included in the control message.

TABLE 1

| Name | Description |
| --- | --- |
| SCell candidate information | SCell candidate information corresponds to identifications of cells, which can be set as SCells among the cells of the SeNB and a measurement result of the cells. The SeNB may determine the cell to be set as the SCell in consideration of the measurement result and load states of the cells. When forward propagation arrival areas (coverage) of cells controlled by one ENB are similar, the SeNB may set a cell, which is not an SCell candidate cell proposed by the MeNB, as the SCell. |
| TAG id information | TAG id information is information related to an identification of a TAG to be set in the SeNB. TAG id information is determined by the MeNB to prevent an identification, which has been already used by the MeNB, from being reused, and is informed of to the SeNB. The TAG (Timing Advance Group) is a set of serving cells having the same backward transmission timing and is described in the standards 36.321 and 36.331. |
| Bearer information to be offloaded | Bearer information to be offloaded is information related to an EPS bearer to be offloaded to the SeNB (or to be offloaded to the SCAG serving cell). Bearer information to be offloaded includes required QoS information, EPS bearer identification information, PDCP configuration information, RLC configuration information, a DRB id, and LCH information. The bearer offloaded to the SeNB is the S-MAC DRB from a viewpoint of the UE. |

TABLE 1-continued

| Name | Description |
| --- | --- |
| | The LCH information includes an LCH id. The RLC configuration information is defined in RLC-config of TS36.331, the PDCP configuration information is defined in PDCP-config, and the LCH information is defined in logicalChannelConfig. |
| Paging consent control-related information | Paging consent control-related information is information provided by the MeNB to allow the SeNB to determine whether to accept or reject an SCell addition request. For example, Paging consent control-related information corresponds to a required transmission rate, an expected uplink data amount, and an expected downlink data amount. |
| GTP Tunnel information | GTP Tunnel information is GTP Tunnel information to be used for backward data forwarding. |

The SeNB 715 performs a paging consent control. When the SeNB 715 determines to accept an SCell addition request, the SeNB 715 determines a cell to which the SCell is set, sets the SCell to the determined cell, and set a DRB for the bearer to be offloaded. The SeNB 715 minimizes influence on the S-MAC DRB by reusing the LCH id which has been used by the MeNB 710. For example, the SeNB 715 allocates 5 to the LCH id when setting the DRB for EPS bearer 2.

The SeNB 715 applies the value, which has been used by the MeNB 710, without any change when allocating the DRB id of the S-MAC DRB. This is because, when a new DRB id is allocated to the S-MAC DRB, the UE 705 should perform an operation for discarding data currently stored in the DRB buffer or transferring the data to a higher layer based on the determination that the new DRB is set.

When setting a PDCP device and an RLC device of the S-MAC DRB, the SeNB 715 applies the PDCP setting and the RLC setting, which have been used by the MeNB 710, without any change. This is because, when another setting is used, the UE 705 should release the currently used DRB and then re-configure the DRB according to the new setting, which results in the harmful operation described above. The SeNB 715 re-configures the PDCP device and the RLC device of the S-MAC DRB and transmits a control message for accepting the SCell addition to the MeNB 710 in step 750. At least some of the information in Table 2 may be included in the control message.

TABLE 2

| Name | Description |
| --- | --- |
| SCellToAddMod | SCellToAddMod is information related to SCells set to the SeNB, that is, SCells of the SCAG (for example, cell 3 and cell 4) and include the following information. sCellIndex-r10, cellIdentification-r10, |

TABLE 2-continued

| Name | Description |
|---|---|
| | radioResourceConfigCommonSCell-r10, radioResourceConfigDedicated SCell-r10, TAG-related information; |
| PUCCH configuration information on PUCCH SCell | A PUCCH (Physical Uplink Control Channel) is set to at least one of the SCells belonging to the SCAG. Backward control information such as HARQ feedback, CSI (higher concept of Channel Status Information or Channel Quality Indicator), or an SR (Scheduling Request) is transmitted through the PUCCH. Hereinafter, the SCell in which the PUCCH is transmitted is referred to as a PUCCH SCell. PUCCH SCell identification information and PUCCH configuration information correspond to lower information of the information. |
| GTP Tunnel information | GTP Tunnel information is GTP Tunnel information to be used for forward data forwarding. |
| UE identification | The UE identification is a C-RNTI to be used by the SCell of a non-primary set. Hereinafter, the UE identification is referred to as a C-RNTI_SeNB. |
| Bearer configuration information | Bearer configuration information is configuration information on a bearer to be offloaded. The Bearer configuration information includes a list of bearers, which are accepted to be offloaded, and configuration information on each bearer. When the bearer configuration is the same, only information on the list of the bearers, which are accepted, may be included. |
| MAC configuration information | MAC configuration information is various pieces of MAC configuration information to be applied to the SCAG serving cell. For example, the MAC configuration information includes DRX-related information, PHR configuration information, and BSR configuration information. The information is transmitted to the UE in the future as the S-MAC configuration information. If the information is identical to the existing MAC configuration information, the information may be omitted. |

When the MeNB 710 receives the control message, the MeNB 710 generates the RRC control message for instructing to the UE 705 to add the serving cell and transmits the RRC control message to the UE 705 in step 755. At least some of the information in Table 3 may be included in the RRC control message. The MeNB 710 stops transmitting/receiving data of the S-MAC DRB.

TABLE 3

| 이름 | 설명 |
|---|---|
| SCellAddMod | SCellAddMod includes information transmitted by the SeNB. That, SCellAddMod is the same as SCellAddMod in Table 2. One SCellAddMod is included per SCell, and the information is lower information of SCellAddModList. |
| PUCCH configuration information on PUCCH SCell | PUCCH configuration information on PUCCH SCell includes information transmitted by the SeNB. That is, the PUCCH configuration information on PUCCH SCell is the same as the PUCCH information for PUCCH SCell in Table 2. |
| SCAG information | SCAG information is information on SCells belonging to the SCAG among set SCells (or information on SCells connected to the S-MAC). The SCAG information may be identifications of the SCells or identifications of TAGs included in the SCAG. |
| UE identification | UE identification is a C-RNTI to be used by the UE in the SCAG serving cell. Hereinafter, the UE identification is referred to as C-RNTI_SeNB |
| Offload bearer information | Offload bearer information is information related to a bearer to be processed by the SeNB (That is, S-MAC DRB). The offload bearer information is information related to a bearer to be transmitted/received through the SCAG serving cells (or bearer to be connected to the S-MAC) and includes a bearer list and bearer configuration information. When the bearer configuration is the same, the bear configuration information may be omitted. A bearer identification in the bearer list may be an identification of the EPS bearer, a DRB id, or an LCH id. When the bear identification is the DRB id, for example, 11 is signaled. |
| S-MAC configuration information | S-MAC configuration information is various pieces of MAC configuration information related to a non-primary set serving cell. For example, the S-MAC configuration information includes DRX-related information, PHR configuration information, and BSR configuration information. When the S-MAC configuration information is |

TABLE 3-continued

| 이름 | 설명 |
|---|---|
| | identical to the current MAC configuration information, the S-MAC configuration information may be omitted. The UE sets the DRX, PHR, and BSR of the S-MAC by using the MAC configuration information. |

When the UE 705 receives an RRC connection reconfiguration control message, the UE 705 sequentially performs the following operations by using various pieces of information included in the control message.

Initiate to use (or generate) an S-MAC
  Stop transmitting data of an S-MAC DRB
  Reconfigure a PDCP of a DRB which meets condition 1 among S-MAC DRBs
  Reconfigure an RLC of the DRB which meets condition 1 among the S-MAC DRBs
  Connect the S-MAC DRB and the S-MAC
  Connect a DL-SCH of the SCAG and the S-MAC
  Connect a UL-SCH of the SCAG and the S-MAC
  Trigger random access by the S-MAC The DRB, which meets condition 1, is a DRB in which "statusReportRequired" is set as yes in an RLC AM (Acknowledged Mode). "statusReportRequired" is configuration information included in PDCP-config. When the information is set as yes, the UE 705 indicates the DRB, which triggers the PDCP status report, after a handover in order to perform a lossless handover. In the present invention, the DRB triggers the PDCP status report when the DRB changes a connection from the general MAC to the S-MAC as well as a case of the handover.

The UE 705 reconfigures the P-MAC as follows.
  Release a connection between the S-MAC DRB and the P-MAC
  Release a connection between the DL-SCH of the SCAG and the P-MAC
  Release a connection between the UL-SCH of the SCAG and the P-MAC
  Flush an HARQ buffer, which stores an MAC PDU including S-MAC DRB data, among uplink HARQ buffers of the PCAG serving cell (flush: discard the content of the buffer).
  Discard the BSR and the PHR, which have not been transmitted yet, and then generate a new BSR and PHR in consideration of P-MAC configuration.

Operations related to the S-MAC and operations related to the P-MAC may be performed simultaneously or sequentially.

The UE 705 establishes forward synchronization with the PUCCH SCell and then performs random access in the PUCCH SCell in step 760. More specifically, the UE 705 transmits the random access preamble by using predetermined frequency resources during a predetermined time interval of the PUCCH SCell, and attempts to receive a random access response message during a predetermined time interval defined based on the time point when the preamble is transmitted. When an effective random access response message is received, the UE 705 analyzes a backward transmission timing advance command of the message to adjust the backward transmission timing. Further, the UE 705 generates an MAC PDU to be transmitted to the PUCCH SCell by using backward transmission resources indicated by backward grant information of the message. When the backward grant is received through the random access response message, the UE 705 triggers the BSR in the S-MAC. The MAC PDU includes a C-RNTI MAC CE and a BSR MAC CE, and a C-RNTI_SENB is specified in the C-RNTI MAC CE. The BSR MAC CE includes buffer status information indicating an amount of data, which can be transmitted, stored in the S-ENB DRM. The C-RNTI MAC CE and the BSR MAC CE are defined in 6.1.3 of TS 36.321.

The UE 705 inspects whether the PDCCH indicating initial transmission, which is addressed to the C-RNTI_SENB, is received in the PUCCH SCell. When the PDCCH, which meets the condition, is received within a predetermined period, the UE 705 determines that the random access is successfully completed and resumes S-MAC DRB data transmission.

At this time, with respect to DRBs, which meet condition 1, among the S-MAC DRBs, the UE 705 generates the PDCP status report and transmits the generated PDCP status report to first data of the corresponding DRB.

Thereafter, the UE 705 connects DRB 11 with SCell 3 and SCell 4 (that is, SCAG serving cell) through the S-MAC. That is, data of DRB 11 is transmitted/received through SCell 3 and SCell 4 in step 765. The UE 705 connects DRB 10 and the SRB with the PCell (that is, PCAG serving cell) through the P-MAC. That is, data of DRB 10 and the SRB is transmitted/received through the PCell in step 770. In addition to the DCCH and the DTCH, the P-MAC connects other logical channels, for example, the PCCH, BCCH, MCCH, and MTCH with a proper transport channel.

Figure 8:
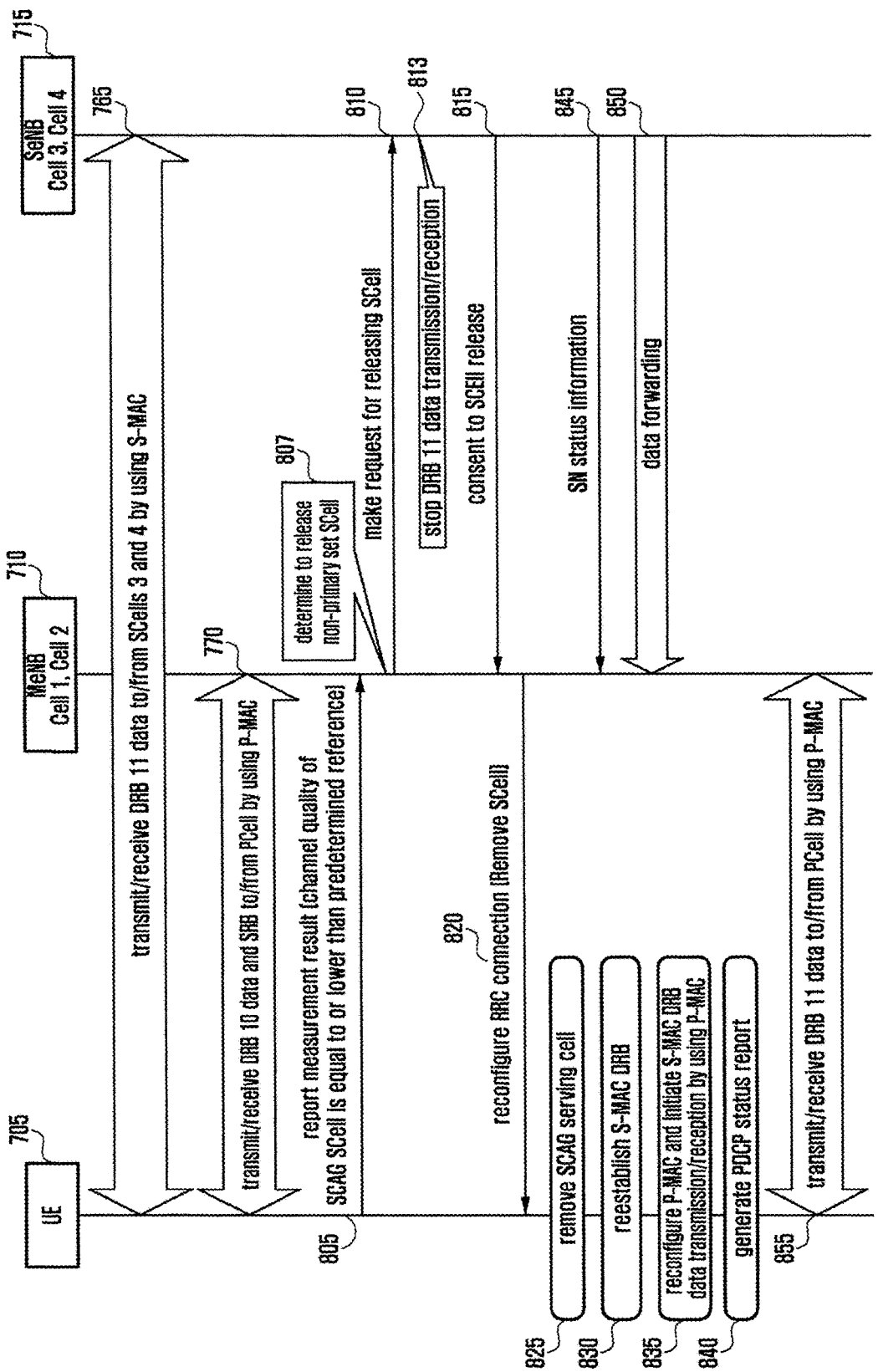
FIG. 8 is a view illustrating a process for releasing the S-MAC.

FIG. 8 is a view illustrating a process for releasing the S-MAC. That is, FIG. 8 is a flowchart illustrating an operation for releasing the SCell and transmitting/receiving data according to an embodiment of the present specification.

The UE 705 report a measurement result indicating that channel quality of the SCAG serving cell is equal to or lower than a predetermined reference to the MeNB 710 at a predetermined time point in step 805. When channel quality of some of the SCAG serving cells, for example, the PUCCH SCell is equal to or lower than a predetermined reference, the MeNB 710 may determine to release all the SCAG serving cells in step 807.

The MeNB 710 transmits a control message making a request for releasing the SCell of the UE 705 to the SeNB 715 in step 810. The SeNB 715 having received the control message performs the following operations in step 813.

Release only some of the SCAG serving cells. If the released serving cell does not include the PUCCH SCell;
    Transmit a predetermined MAC CE (Activation/Deactivation MAC CE, refer to TS 36.321) and deactivate the released SCells.
    Release the SCell instructed to be released.
  Release only some of the SCAG serving cells. However, if the released serving cell includes the PUCCH SCell (that is, there is no PUCCH SCell when the SCell is released) or all the SCAG serving cells are released;
    Transmit a predetermined MAC CE (hereinafter, referred to as a first MAC CE) to deactivate the SCells and prevent backward transmission of the PUCCH SCell.
    Release all SCAG serving cells.
    Stop transmitting/receiving S-MAC DRB data.
    Reestablish the RLC device and the PDCP device of the S-MAC DRB.

Proceeds to step 845 and transmit SN status information.

The first MAC CE includes only an MAC sub header without payload, and instructs the UE 705 to perform the following operations.

Deactivate the remaining serving cells except for the PUCCH SCell among SCAG serving cells currently in an active state
  Prevent backward transmission of the PUCCH SCell (for example, transmission of a channel quality indicator, a scheduling request, or a random access preamble)

The SeNB 715 transmits a control message for consenting to the release of the SCell to the MeNB 710 in step 815.

The MeNB 710 transmits a control message indicating the release of the SCell to the UE 705 in step 820. The control message includes identification information on the SCell to be released. The UE 705 having received the control message performs the following operations.

Release only some of the SCAG serving cells. If the released serving cell does not include the PUCCH SCell;
  Release the SCell instructed to be released
  Maintain transmitting/receiving S-MAC DRB data
  Release only some of the SCAG serving cells. However, if the released serving cell includes the PUCCH SCell (that is, there is no PUCCH SCell when the SCell is released) or all the SCAG serving cells are released;
  Release all SCAG serving cells in step 825
  Stop transmitting/receiving S-MAC DRB data
  Stop using (or remove) the S-MAC
  Reconfigure a PDCP of a DRB which meets condition 1 among S-MAC DRBs in step 830
  Reconfigure an RLC of the DRB which meets condition 1 among the S-MAC DRBs in step 830
  Configure connection between the S-MAC DRB and the P-MAC
  Resume transmitting/receiving S-MAC DRB data in step 835
  Generate a PDCP STATUS REPORT for the DRB which meets condition 1 among the S-MAC DRBs in step 840

Thereafter, the UE 705 transmits/receives the S-MAC DRB data through the P-MAC and the PCAG serving cell (for example, PCell) in step 855. The SeNB 715 transmits an SN status information message to the MeNB 710 and forwards data in step 850. The MeNB 710 performs S-MAC DRB transmission/reception with the UE 705 by using the forwarded data. The SN status information message may include at least some of the information on the S-MAC DRB, which meets condition 1, in Table 4 below.

TABLE 4

| Name | Description |
| --- | --- |
| UL PDCP PDU reception status information | UL PDCP PDU reception status information corresponds to a bitmap in a predetermined size. An nth bit indicates a reception status of a PDCP SDU having a PDCP SN of m. m = (PDCP SN of first non-received PDCP SDU + n) modulo (Max PDCP SN + 1) |
| UL COUNT | A UL COUNT corresponds to a count of the first non-received PDCP SDU. The count is a 32-bit integer |

TABLE 4-continued

| Name | Description |
| --- | --- |
| | and increases by 1 per PDCP SDU. The COUNT is a value made from an HFN and the PDCP SN which are connected to each other. |
| DL COUNT | A DL COUNT is a count to be assigned to a first PDCP SDU among the PDCP SDUs to which the PDCP SNs have not been yet allocated. |

The PDCP STATUS REPORT is a control message exchanged between PDCP transmission and reception devices in order to prevent a packet loss when the RLC cannot temporarily perform the ARQ due to reconfiguration of the RLC device. The PDCP STATUS REPORT includes a FMS (First Missing Sequence) and a bitmap and is described in the standard 36.323 in detail.

The MeNB 710 and the SeNB 715 forward data as follows in step 850.

forward data: transmits PDCP SDUs, of which successful transmission is not certain, among PDCP SDUs stored in the buffer.
    Forward PDCP SDUs, to which the PDCP SNs have been already allocated, with PDCP SN information allocated to a GTP header.
    Forward PDCP SDUs, to which the PDCP SNs have yet allocated, with no PDCP SN information in the GTP header.
  Backward data
    Forward PDCP SDUs which have been successfully received but not sequentially arranged. At this time, PDCP SN information is included in the GTP header.

Figure 9:
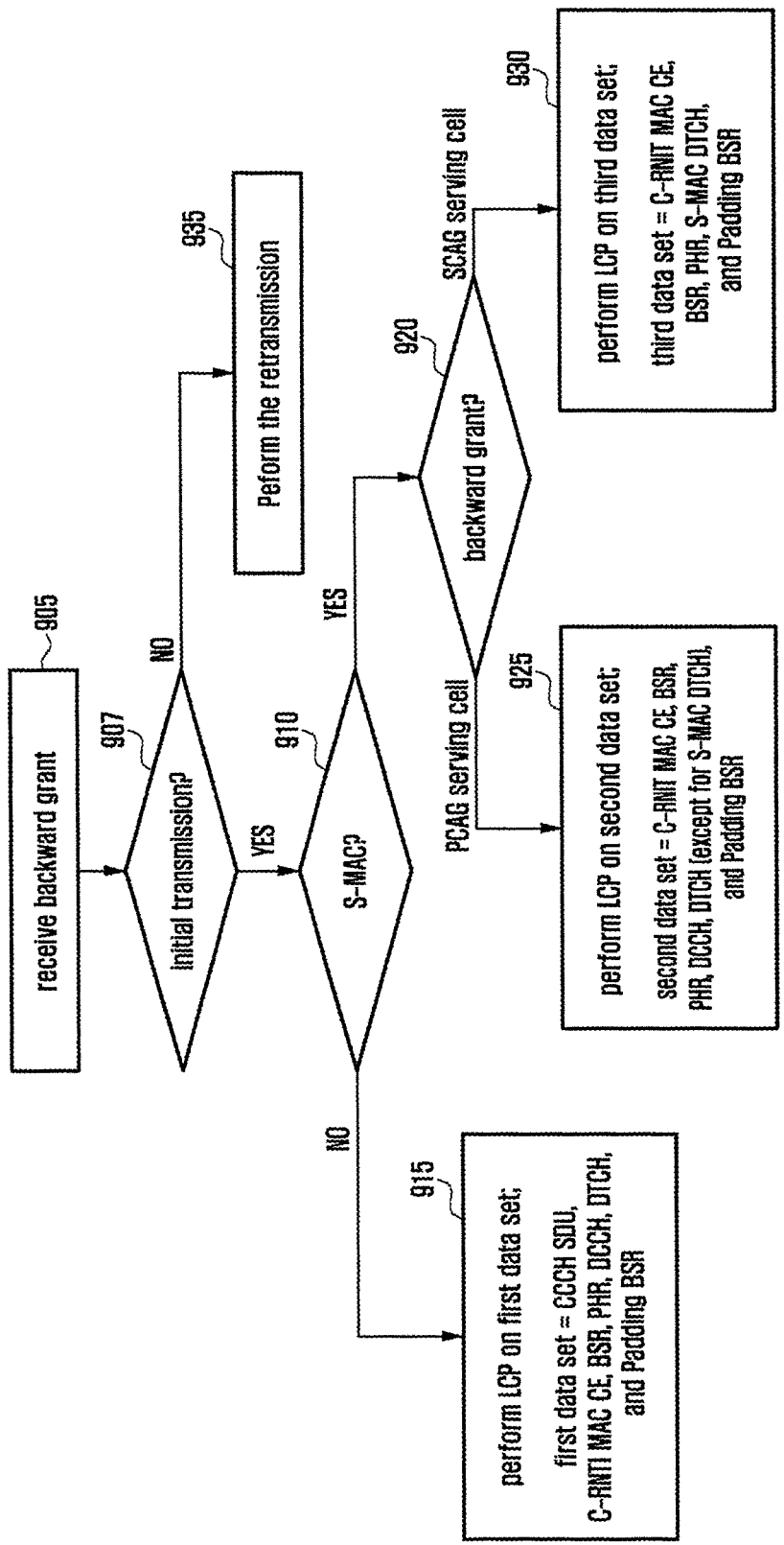
FIG. 9 is a view illustrating an operation of the UE performing LCP.

FIG. 9 is a view illustrating an operation of the UE performing LCP. That is, FIG. 9 illustrates an operation for determining data to be transmitted by the UE having received the backward grant. The operation is referred to as LCP (Logical Channel Prioritization).

When the backward grant is received in step 905, the UE proceeds to step 907 and inspects whether the backward grant indicates initial transmission. Whether the backward grant indicates initial transmission is determined using a field of an NDI (New Data Indicator). When the NDI is identical to a previous value, it is for retransmission. When the NDI is different from the previous value, it is for the initial transmission. The UE proceeds to step 910 when the received grant is for the initial transmission, and proceeds to step 935 when the received grant is for the retransmission.

In step 935, the UE performs the retransmission by applying backward transmission resources and an RV (Redundancy Version) indicated by the grant. The UE inspects whether the S-MAC is set, the S-MAC is being used, or the SCAG is set in step 910 and, if so, proceeds step 920. When the S-MAC is not set (or the S-MAC is not being used or the SCAG is not set), the UE proceeds to step 915. In the present specification, whether the S-MAC is set, whether the S-MAC is used, and whether the SCAG is set are all equivalence conditions.

In step 915, the UE performs the LCP on a first data set. In the first data set below, pieces of data are arranged according to a priority.
  CCCH SDU, C-RNTI MAC CE
  Buffer Status Report (except for Padding BSR)
  Power Headroom Report
  DCCH data DTCH data
Padding BSR In step 920, the UE inspects whether the serving cell in which the backward grant is received (or serving cell to which backward transmission resources are allocated through the backward grant) is the serving cell of the PCAG or the SCAG. The UE proceeds to step 925 when the serving cell is the serving cell of the PCAG, and proceeds to step 930 when the serving cell is the serving cell of the SCAG.

In step 925, the UE performs the LCP on a second data set. In the second data set below, pieces of data are arranged according to a priority.

C-RNTI MAC CE generated in P-MAC
Buffer Status Report (except for Padding BSR) generated in P-MAC
Power Headroom Report generated in P-MAC
DCCH data
Remaining DTCH data except for S-MAC DTCH
Padding BSR generated in P-MAC In step 930, the UE performs the LCP on a third data set. In the third data set below, pieces of data are arranged according to a priority.

C-RNTI MAC CE generated in S-MAC
Buffer Status Report (except for Padding BSR) generated in S-MAC
Power Headroom Report generated in S-MAC
S-MAC DTCH data
Padding BSR generated in S-MAC The LCP refers to a process for, when backward grant through which new transmission of n-byte data can be performed is received, selecting data to be included in the MAC PDU to be transmitted using the grant.

Performing the LCP on a predetermined data set refers to sequentially performing operations for inspecting whether highest priority data exists among data included in the data set, first selecting the highest priority data when the data exists, and inspecting whether the next priority data exists and determining whether to select the data. The priority is unilinearly applied to the remaining data except for the DTCH data. That is, when higher priority data exits, lower priority data cannot be transmitted. The priority is doubly applied to the DTCH data. A PBR (Prioritized Bit Rate), which is a kind of minimum data rate may be allocated to each DTCH, and lower priority DTCH data may be selected in preference to higher priority DTCH data within the limits of the PBR.

Figure 10:
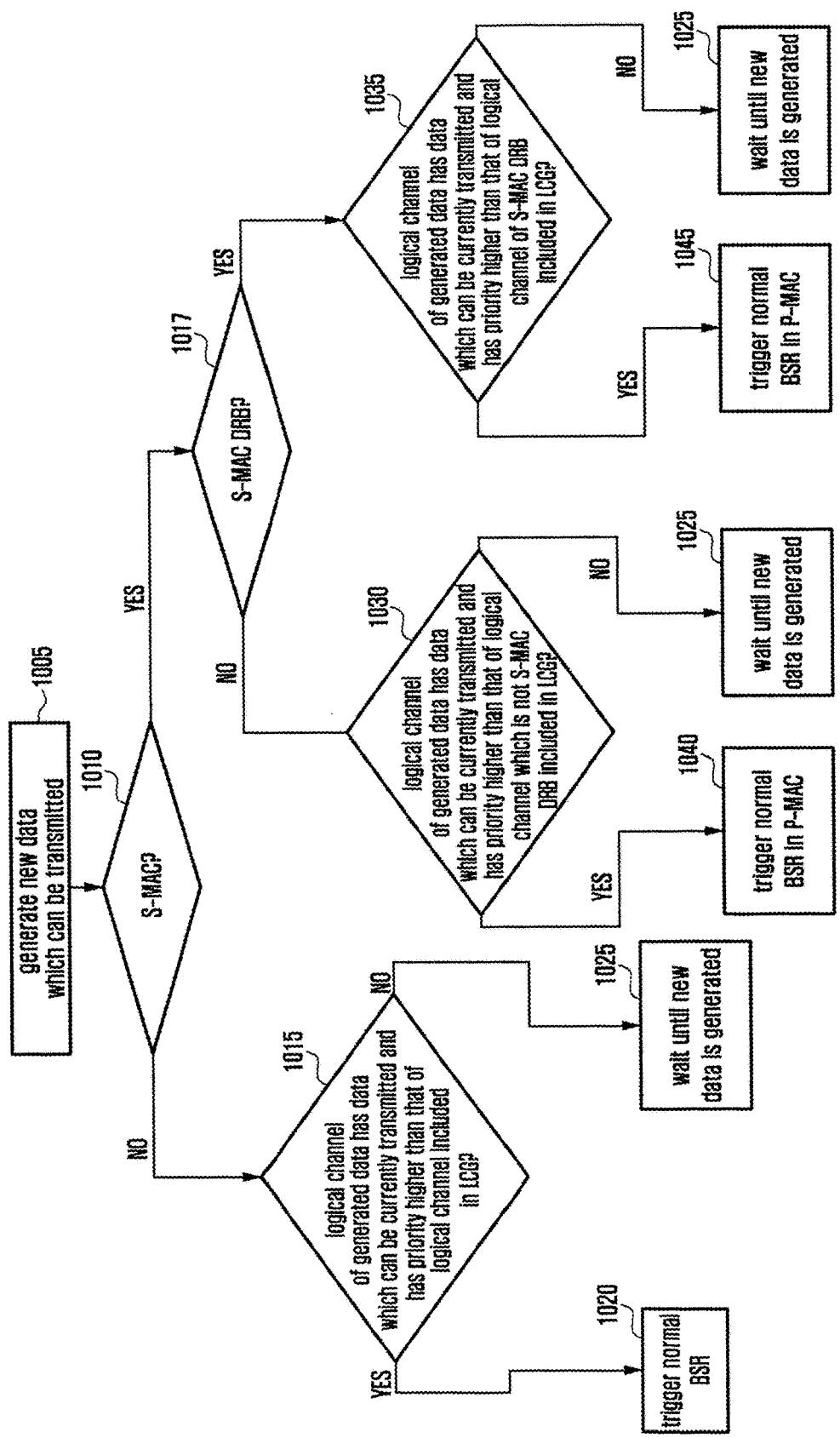
FIG. 10 is a view illustrating an operation of the UE triggering a normal BSR.

FIG. 10 is a view illustrating an operation of the UE triggering a normal BSR. In FIG. 10, a UE operation related to the BSR is illustrated. General matters of the BSR follow the standard 36.321.

New data which can be transmitted to an RLC device or a PDCP device of a logical channel at a predetermined time point is generated in step 1005. The UE proceeds to step 1010 and inspects whether the S-MAC is set. The UE proceeds to step 1015 when the S-MAC is not set, and proceeds to step 1017 when the S-MAC is set.

The UE inspects whether the newly generated data meets [condition 2] in step 1015. The UE triggers the normal BSR in step 1020 when the data meets [condition 2], and waits until new data is generated in step 1025 when the data does not meet [condition 2]. A logical channel group is a set of logical channels having similar priorities and BSR buffer status are reported according to each logical channel group. A predetermined logical channel generally belongs to one logical channel group, but a logical channel, which does not require the buffer status report, may not belong to the logical channel group.

[Condition 2]
The logical channel of the generated data belongs to the logical channel group; and
The priority of the logical channel is higher than priorities of all logical channels which meet a predetermined condition. A logical channel having data, which can be transmitted, and belonging to the logical channel group is the logical channel meeting the predetermined condition.

The UE inspects whether the logical channel of the newly generated data is the S-MAC DRB in step 1017. The UE proceeds to step 1035 when the logical channel is the S-MAC DRB, and proceeds to step 1030 when the logical channel is not the S-MAC DRB.

The UE inspects whether the newly generated data meets [condition 3] in step 1030. The UE triggers the normal BSR in the P-MAC in step 1040 when the data meets [condition 3], and waits until new data is generated in step 1025 when the data does not meet [condition 3].

[Condition 3]
The logical channel of the generated data belongs to the logical channel group; and
The priority of the logical channel is higher than priorities of all logical channels which meet a predetermined condition. A logical channel having data, which can be transmitted, belonging to the logical channel group, and corresponds to the P-MAC DRB or the SRB is the logical channel meeting the predetermined condition.

The UE inspects whether the newly generated data meets [condition 4] in step 1035. The UE triggers the normal BSR in the S-MAC in step 1045 when the data meets [condition 4], and waits until new data is generated in step 1025 when the data does not meet [condition 4].

[Condition 4]
The logical channel of the generated data belongs to the logical channel group; and
The priority of the logical channel is higher than priorities of all logical channels which meet a predetermined condition. A logical channel having data, which can be transmitted, belonging to the logical channel group, and corresponds to the S-MAC DRB is the logical channel meeting the predetermined condition.

Condition 4 above will be described with an example. Logical channel shown in Table 5 below are set to the UE.

TABLE 5

| | Logical channel priority | Data which can be transmitted | S-MAC DRB | Logical channel group |
|---|---|---|---|---|
| LCH 1 | 0 | No | No | 0 |
| LCH 2 | 1 | YES | No | 0 |
| LCH 4 | 2 | No | YES | 1 |
| LCH 5 | 3 | YES | YES | 2 |
| LCH 6 | 4 | YES | YES | No |

For example, it is assumed that data, which can be transmitted to the PDCP device or RLC device of LCH 4, is newly generated. Since the data is generated in the S-MAC DRB, the UE considers only the S-MAC DRB. Since LCH 6 does not belong to the logical channel group, LCH 6 is excluded from targets to be considered and the remaining LCHs such as LCH 4 and LCH 5 are considered. At this time, LCH 4 has no data, which can be transmitted, and LCH 5 has data, which can be transmitted, but a priority of LCH 5 is lower than a priority of LCH 4. Accordingly, condition 4 is met and thus the normal BSR is triggered in the S-MAC.

In contrast, when data, which can be transmitted to the PDCP device or RLC device of LCH 5, is newly generated, the UE considers only the LCH corresponding to the S-MAC DRB and having data, which can be transmitted. Accordingly, the UE considers only LCH 5. Further, since LCH 5 has the data which can be transmitted, a priority of the logical channel of the newly generated data is equal to a priority of LCH 5 and condition 4 is not met.

When the BSR is triggered in the P-MAC, the UE generates the BSR in consideration of only data of the P-MAC DRB and the SRB, which can be transmitted, among the logical channels belonging to the logical channel group and transmits the generated BSR through the PCAG.

When the BSR is triggered in the S-MAC, the UE generates the BSR in consideration of only data of the S-MAC DRB, which can be transmitted, among the logical channels belonging to the logical channel group and transmits the generated BSR through the SCAG.

When the normal BSR is triggered in a state where the S-MAC is not set, the UE generates the BSR in consideration of data of all logical channels belonging to the logical channel group, which can be transmitted, and transmits the BSR through a predetermined serving cell.

Figure 11:
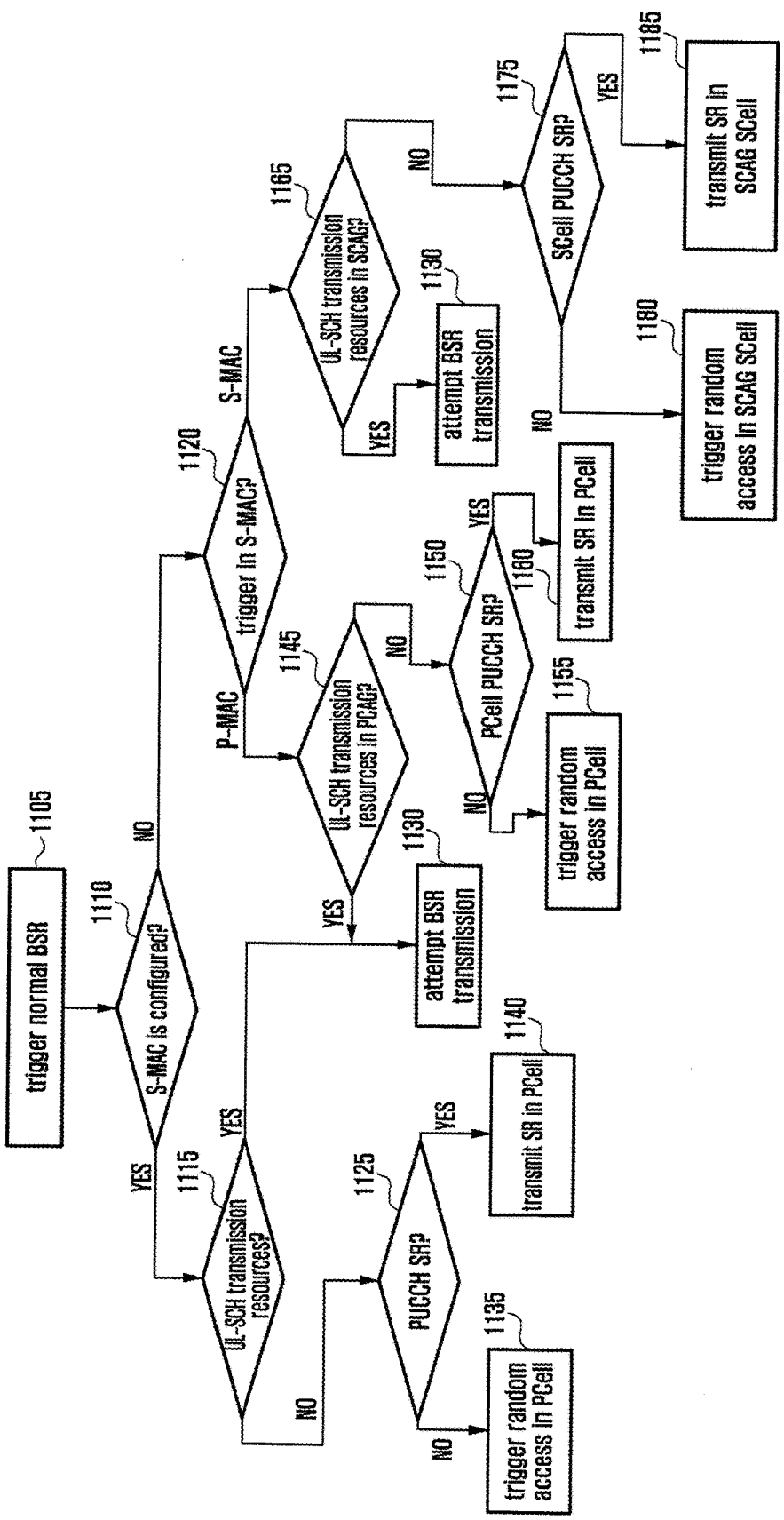
FIG. 11 is a view illustrating an operation of the UE transmitting the normal BSR.

FIG. 11 is a view illustrating an operation of the UE for transmitting the normal BSR. More specifically, in FIG. 11, a UE operation when the normal BSR is triggered is described in more detail.

When the normal BSR is triggered in step 1105, the UE proceeds to step 1110 and inspects whether the S-MAC is set. The UE proceeds to step 1115 when the S-MAC is not set, and proceeds to step 1120 when the S-MAC is set.

In step 1115, the UE inspects whether UL-SCH transmission resources can be used for all of the currently set serving cells. The UE proceeds to step 1130 when the transmission resources can be used, and proceeds to step 1125 when the transmission resources cannot be used.

In step 1130, the UE attempts BSR transmission. When backward transmission using the UL-SCH transmission resources has not yet started, the BSR transmission is possible. However, when the backward transmission using the UL-SCH transmission resources has already started or will start after a short time, the BSR transmission is not possible. The UE ends the process when the BSR transmission is successful, and waits until the next TTI and returns to the previous step when the BSR transmission attempt fails.

In step 1125, the UE inspects whether PUCCH transmission resources for transmitting a scheduling request are set. The UE proceeds to step 1140 when the PUCCH transmission resources are set, and proceeds to step 1135 when the PUCCH transmission resources are not set.

In step 1135, the UE triggers random access in the PCell. In step 1140, the UE transmits the SR by using the PUCCH transmission resources. The ENB recognizes that the UE requires transmission resources through the random access process or the SR transmission and, when the ENB allocates transmission resources to the UE, the UE transmits the normal BSR.

In step 1120, the UE inspects whether the normal BSR is triggered in the P-MAC or the S-MAC. The UE proceeds to step 1145 when the normal BSR is triggered in the P-MAC, and proceeds to step 1165 when the normal BSR is triggered in the S-MAC.

In step 1145, the UE inspects whether UL-SCH transmission resources can be used for PCAG serving cells. The UE proceeds to step 1130 when the UL-SCH transmission resources can be used, and proceeds to step 1150 when the transmission resources cannot be used.

In step 1150, the UE inspects whether PUCCH transmission resources for transmitting a scheduling request are set to the PCell. The UE proceeds to step 1160 when the PUCCH transmission resources are set, and proceeds to step 1155 when the PUCCH transmission resources are not set. In step 1155, the UE triggers random access in the PCell. In step 1160, the UE transmits the SR by using the PUCCH transmission resources of the PCell. The MeNB recognizes that the UE requires transmission resources through the random access process or the SR transmission and, when the MeNB allocates transmission resources to the UE, the UE transmits the normal BSR.

In step 1165, the UE inspects whether UL-SCH transmission resources can be used for SCAG serving cells. The UE proceeds to step 1130 when the UL-SCH transmission resources can be used, and proceeds to step 1175 when the transmission resources cannot be used. In step 1175, the UE inspects whether PUCCH transmission resources for transmitting a scheduling request are set to the SCAG serving cell (or SCell). The UE proceeds to step 1185 when the PUCCH transmission resources are set, and proceeds to step 1180 when the PUCCH transmission resources are not set. In step 1180, the UE triggers random access in the SCAG SCell. In step 1185, the UE transmits the SR by using the PUCCH transmission resources of the SCAG SCell. The SeNB recognizes that the UE requires transmission resources through the random access process or the SR transmission and, when the SeNB allocates transmission resources to the UE, the UE transmits the normal BSR.

Figure 12:
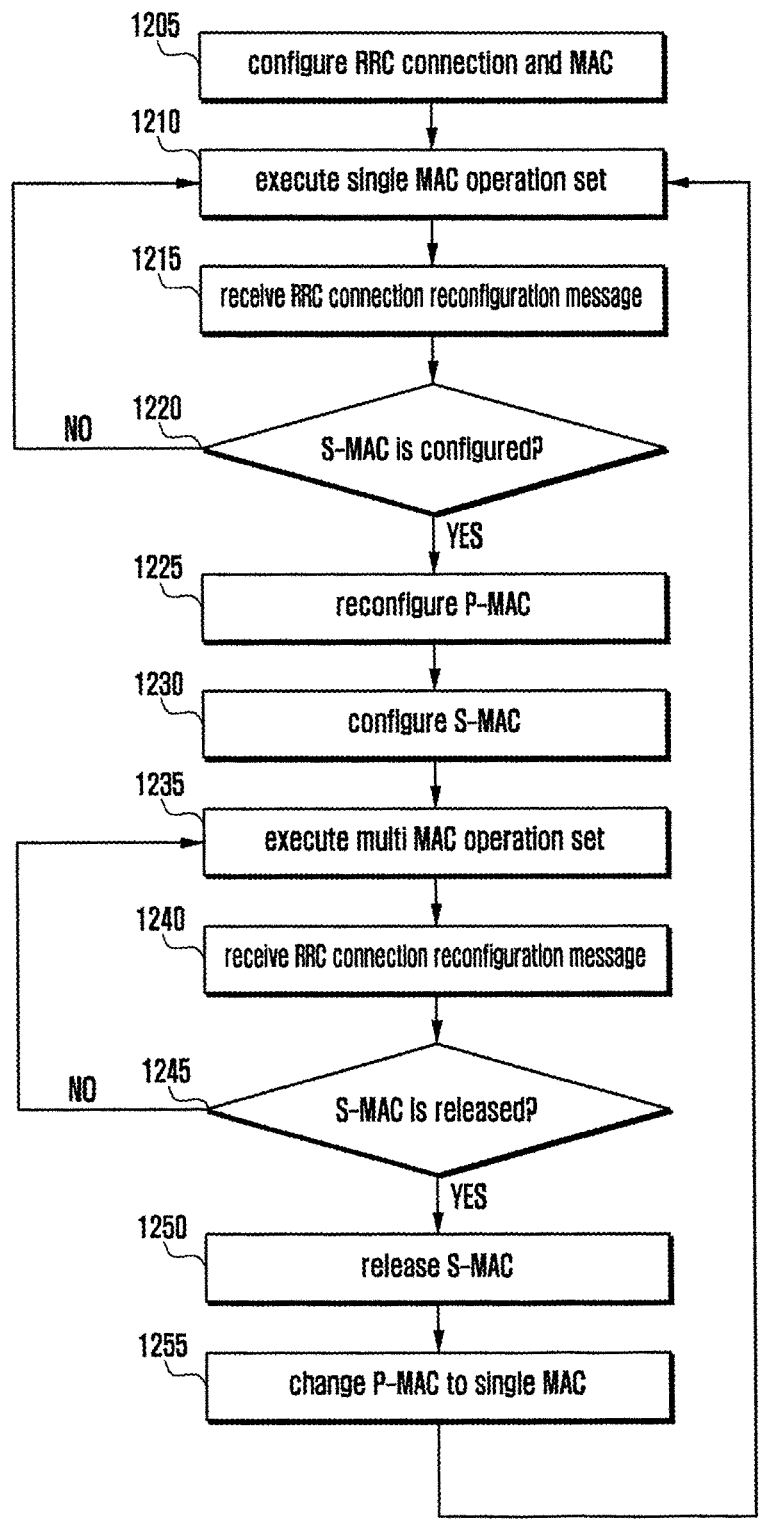
FIG. 12 is a view illustrating all operations of the UE.

FIG. 12 is a view illustrating all operations of the UE.

In step 1205, the UE sets an RRC connection with a predetermined ENB for a predetermined reason. An RRC connection configuration process includes a process in which the UE transmits an RRC CONNECTION REQUEST message to the ENB and the ENB transmits an RRC CONNECTION SETUP (or RRC CONNECTION ESTABLISHMENT) message. After the RRC connection is configured, the UE may perform data transmission/reception with the LTE network through the ENB.

During the RRC connection configuration process, the MAC is set to the UE. It may be understood that various functions, for example, BSR, PHR, and DRX are set to the UE in the MAC configuration. Thereafter, in step 1210, the UE executes a single MAC operation set in connection with the set functions.

[Single MAC Operation Set]

An operation for determining whether to trigger a buffer status report in consideration of data of all logical channels set to the UE, which can be transmitted and the backward grant for all serving cells, and transmitting the buffer status report. A general UE operation for triggering the buffer status report and transmitting the buffer status report is described in the standard 36.321.

An operation for determining whether to trigger a PHR in consideration of activated serving cells among all serving cells set to the UE and the backward grant for all serving cells, and transmitting the PHR A general UE operation for triggering the PHR and transmitting the PHR is described in the standard 36.321.

include one onDurationTimer, one drx-InactivityTimer, one drx-RetransmissionTimer, and one mac-ContentionResolutionTimer, and manage the timer in consideration of downlink assignment received from all serving cells set to the UE or the uplink grant. While at least one of the timers is driven, PDCCHs of all serving cells in an active state are monitored at a corresponding time point. The content related to the timers is described in the standard 36.321.

When an RRC connection reconfiguration message is received from the ENB in step 1215 while the single MAC operation set is executed, the UE inspects whether the S-MAC configuration is instructed by the RRC connection reconfiguration message in step 1220. The UE proceeds to step 1225 when the S-MAC configuration is instructed, and the UE proceeds to step 1210 and continues to execute the single MAC operation set when the S-MAC configuration is not instructed.

In step 1225, the UE performs a P-MAC reconfiguration. The P-MAC reconfiguration includes an operation for separating the S-MAC DRB and the SCAG SCells from the existing MAC device, and an operation for discarding the PHR and the BSR, which have been generated but not yet transmitted and newly generating the PHR and the BSR. The reason for discarding the PHR and the BSR is that the content related to the SCAG SCell and the content related to the S-MAC DRB may be included in the PHR and the BSR generated before the P-MAC is reconfigured.

In step 1230, the UE configures the S-MAC. The S-MAC configuration includes an operation for generating a new MAC device, activating the MAC device provided for the S-MAC, inputting, into a controller of the MAC device, BSR configuration information, PHR configuration information, and DRX configuration information included in S-MAC configuration information, and connecting the S-MAC DRB and the SCAG SCell with the S-MAC. When the S-MAC configuration information is not provided, the UE applies the current P-MAC configuration.

In step 1235, the UE executes a multi MAC operation set.

[S-MAC Operation Set of Multi MAC Operation Set]

An operation for determining whether to trigger a buffer status report in consideration of data of the S-MAC DRB, which can be transmitted, among logical channels set to the UE and the backward grant for the SCAG SCell, and transmitting the buffer status report.

An operation for determining whether to trigger a PHR in consideration of activated serving cells among SCAG SCells set to the UE and the backward grant for the SCAG SCells, and transmitting the PHR.

include one onDurationTimer, one drx-InactivityTimer, one drx-RetransmissionTimer, and one mac-ContentionResolutionTimer, and manage the timer in consideration of downlink assignment received from the SCAG SCells set to the UE or the uplink grant. While at least one of the timers is driven, PDCCHs of the SCAG SCells in an active state are monitored at a corresponding time point.

[P-MAC Operation Set of Multi MAC Operation Set]

An operation for determining whether to trigger a buffer status report in consideration of data, which can be transmitted, of the remaining logical channels except for the S-MAC DRB among logical channels set to the UE and the backward grant for the PCAG serving cell, and transmitting the buffer status report.

An operation for determining whether to trigger a PHR in consideration of activated serving cells among PCAG SCells set to the UE and the backward grant for the PCAG SCells, and transmitting the PHR.

include one onDurationTimer, one drx-InactivityTimer, one drx-RetransmissionTimer, and one mac-ContentionResolutionTimer, and manage the timer in consideration of downlink assignment received from the PCAG serving cell set to the UE or the uplink grant.

While at least one of the timers is driven, PDCCHs of all PCAG serving cells in an active state are monitored at a corresponding time point.

When the UE receives an RRC connection reconfiguration message from the ENB in step 1240 while executing the multi MAC operation set, the UE proceeds to step 1245 and inspects whether information instructing to release the S-MAC is included in the RRC connection reconfiguration message. The UE proceeds to step 1250 when the information instructing to release the S-MAC is included in the RRC connection reconfiguration message, and proceeds to step 1235 and continues to execute the multi MAC operation set when the information instructing to release the S-MAC is not included in the RRC connection reconfiguration message. In step 1250, the UE releases the S-MAC. In step 1255, the UE reconfigures the P-MAC to be a single MAC. That is, the UE connects the DRBs, which have been the S-MAC DRBs, with the P-MAC. Further, the UE returns to step 1210 and executes the single MAC operation set.

[Second Embodiment]

In an LTE mobile communication, mobility of a connected UE is controlled by the ENB. Unless the eNB instructs a handover, the UE performs general operations in a current serving cell, for example, operations for monitoring the PDCCH and transmitting the PUCCH. When a radio link status of the serving cell deteriorates and thus normal communication is not possible due to unexpected errors before the ENB instructs the UE to perform the handover, the UE becomes deadlocked in the current serving cell. In order to prevent this, the UE monitors a channel status of the current serving cell and, when a predetermined condition is met, declares a radio link failure and controls mobility of the UE by itself.

The radio link failure may be generated due to various factors. For example, when the random access fails or when transmission is not successful even through the transmission is performed by a maximum number of RLC retransmissions, the radio link failure may be declared. As inter-ENB CA is introduced, direct application of the existing radio link failure operation may reduce communication efficiency. The present invention proposes a more efficient radio link failure operation in an inter-ENB CA environment.

Figure 13:
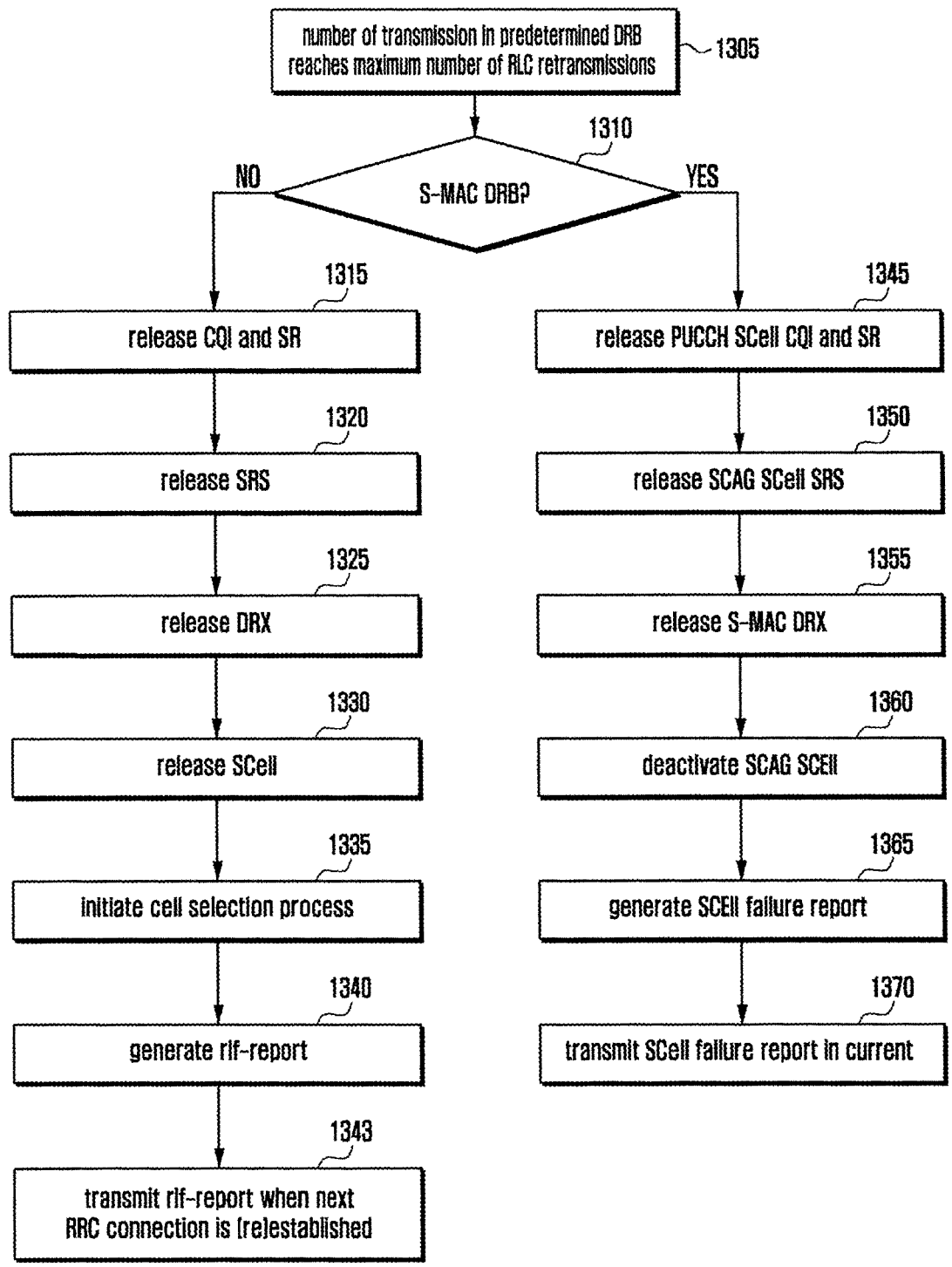
FIG. 13 is a view illustrating an operation of the UE when a number of transmissions in a predetermined DRB reaches a maximum number of RLC retransmissions.

FIG. 13 illustrates operations of the UE when a number of transmissions of predetermined RLC data of a predetermine DRB reaches a maximum number of RLC retransmissions.

The RLC data reaching the maximum number of RLC retransmissions may mean the same situation as that in which RETX_COUNT is maxRetxThreshold, which is described in the standard 36.322 in more detail.

When predetermined RLC data of a predetermined DRB reaches a maximum number of RLC retransmissions in step 1305, the UE inspects whether the DRB is the S-MAC DRB in step 1310. The UE proceeds to step 1315 when the DRB is not the S-MAC DRB (that is, when the DRB is an SRB or a DRB connected to the P-MAC or a logical channel transmitted/received through the PCAG/MeNB), and proceeds to step 1345 when the DRB is the S-MAC DRB.

The UE proceeding to step 1315 means that a serious problem occurs in uplink transmission of the PCAG serving cell and thus the RRC connection should be reestablished. That is, it means that the radio link failure is generated. The UE releases all of the CQI configuration and the SR configuration set to the UE in step 1315. In other words, the UE releases CQI transmission resources set to the PUCCH of the PCell and stops performing CQI transmission. When the CQI transmission resources are set to the PUCCH of the SCell, the UE also releases the PUCCH transmission resources of the PCell and stops performing the CQI transmission.

In step 1320, the UE releases all SRS configurations set to the UE. In other words, the UE releases all SRS configurations set to the PCAG serving cell and the SCAG serving cell and stops performing SRS transmission.

In step 1325, the UE releases all of the DRX of the P-MAC and the DRX of the S-MAC. In other words, the UE stops all of the DRX operations of the P-MAC and the DRX operations of the S-MAC (or stops all of the DRX operations of the PCAG serving cell and the DRX operations of the SCAG serving cell).

In step 1330, the UE releases all SCells set to the UE, that is, the SCell of the PCAG and the SCell of the SCAG. Through the above process, backward transmission of the UE is fundamentally blocked and backward interference generated by the UE is prevented.

In step 1335, the UE initiates a cell selection process. The cell selection process is a process for searching for a cell, of which intensity of a downlink signal is larger than or equal to a predetermined reference and in which the UE is accepted to attempt the RRC connection configuration, and selecting the found cell, which is described in the standard 36.304 in detail. The UE generates and stores an rlf-report before and after the cell selection process is initiated. The rlf-report includes information related to the radio link failure and corresponds to, for example, an identification of a serving cell at a time point when the radio link failure is generated, a channel status of the serving cell, channel statuses of neighboring cells, and information specifying a point where the radio link failure is generated.

When the next RRC connection, which is not the current RRC connection, is established or reestablished, the UE initiates a process for transmitting the generated rlf-report in step 1343. For example, the UE reports the existence of the rlf-report to the ENB during the RRC connection establishment of reestablishment process or after the RRC connection is established and, when the ENB instructs transmission of the rlf-report, transmits the rlf-report.

In step 1345, the UE releases the CQI configuration and the SR configuration of the PUCCH SCell. That is, the UE releases the CQI configuration and the SR configuration set to the SCAG SCell and stops CQI transmission and SR transmission. The CQI transmission and the SR transmission set to the PCell PUCCH are maintained.

In step 1350, the UE releases the SRS set to the SCAG SCell and stops SRS transmission. At this time, the UE maintains the SRS transmission of the PCAG SCell.

In step 1355, the UE releases the DRX of the S-MAC and stops the S-MAC DRX operation. At this time, the UE maintains the DRX operation of the P-MAC.

In step 1360, the UE deactivates the SCAG SCell instead of releasing the SCAG SCell. This is to prevent a data loss in the future by releasing the SCAG SCell according to an instruction of the ENB.

In step 1365, the UE generates an SCell failure report. The SCell failure report includes information related to the SCell failure and corresponds to, for example, a channel status of the PUCCH SCell at a time point when the SCell failure is generated, channel statuses of other SCells, and information specifying a point where the SCell failure is generated.

In step 1370, the UE transmits the SCell failure report to the ENB by using the current RRC connection through the PCAG serving cell.

The UE stops data transmission/reception of the DRB, which reaches the maximum number of RLC retransmissions at a predetermined time point, for example, before step 1345 while performing the process.

Figure 14:
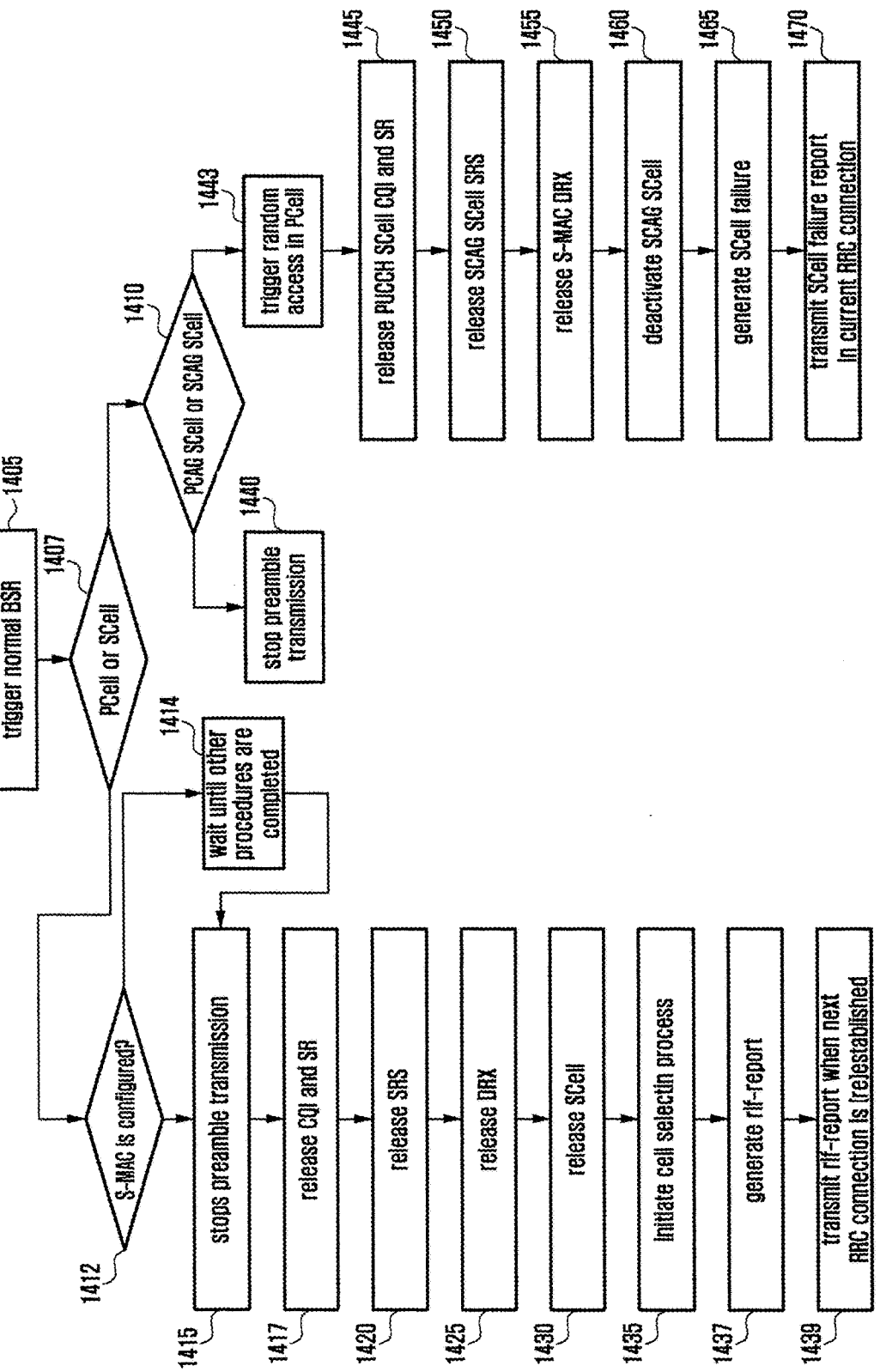
FIG. 14 is a view illustrating an operation of the UE when random access fails.

FIG. 14 illustrates an operation of the UE when random access fails.

The random access failure is generated when the random access is not succeeded even though the UE has transmitted preambles by a predetermined number of times. More specifically, when PREAMBLE_TRANSMISSION_COUNTER becomes preambleTransMax+1, it is determined that the random access fails. PREAMBLE_TRANSMISSION_COUNTER and preambleTransMax are described in the standard 36.321.

When the random access fails in step 1405, the UE proceeds to step 1407 and inspects whether the random access failure is generated in the PCell or the SCell. When a random access preamble of a predetermined random access process is transmitted in the PCell, the random access process is performed in the PCell. When the random access preamble is transmitted in the SCell, the random access process is performed in the SCell. The UE proceeds to step 1412 when the random access failure corresponds to the random access failure generated in the PCell, and proceeds to step 1410 when the random access failure corresponds to the random access failure generated in the SCell.

In step 1412, the UE inspects whether another process is performed in the PCell. The random access of the PCell may be performed together with an RRC connection establishment procedure, an RRC connection reestablishment procedure, and a handover procedure. As described above, when the random access is performed together with another procedure, even though the random access failure is generated, the UE waits until the procedure is completed without immediately declaring the radio link failure. Whether the procedure is performed or not may be determined whether a timer T300, T301, T304, or T311 is driven. When one of the timers is driven, the UE proceeds to step 1414 and waits until the timer expires. When the timers are not driven, the UE proceeds to step 1415. The timers T300, T301, T304, and T311 are described in the standard 36.331.

In step 1415, the UE stops transmitting the preamble. That is, the UE stops the random access process. Step 1417 is identical to step 1315. Step 1420 is identical to step 1320. Step 1425 is identical to step 1325. Step 1430 is identical to step 1330. Step 1435 is identical to step 1335. Step 1437 is identical to step 1340. Step 1439 is identical to step 1343.

In step 1410, the UE inspects whether the SCell in which the random access fails is the SCell belonging to the PCAG or the SCAG. When the random access fails in the PCAG SCell, the UE proceeds to step 1440, and stops transmitting the preamble and ends the process. Since the random access of the PCAG SCell is performed according to an instruction of the ENB in order to establish backward transmission timing, if the random access fails, the ENB recognizes the failure. Accordingly, although the UE does not perform a separate operation, the ENB may take proper steps. In contrast, in a case of the random access of the PCell or the random access of the SCAG SCell, the UE can trigger the random access by itself. Accordingly, when the random access failure is generated, the UE takes required steps by itself.

When the random access fails in the SCAG SCell, for example, a PUCCH SCell, the UE stops transmitting the preamble in step 1443 and proceeds to step 1445. Step 1445 is identical to step 1345. Step 1450 is identical to step 1350. Step 1455 is identical to step 1355. Step 1460 is identical to step 1360. Step 1465 is identical to step 1365. Step 1470 is identical to step 1370.

Figure 15:
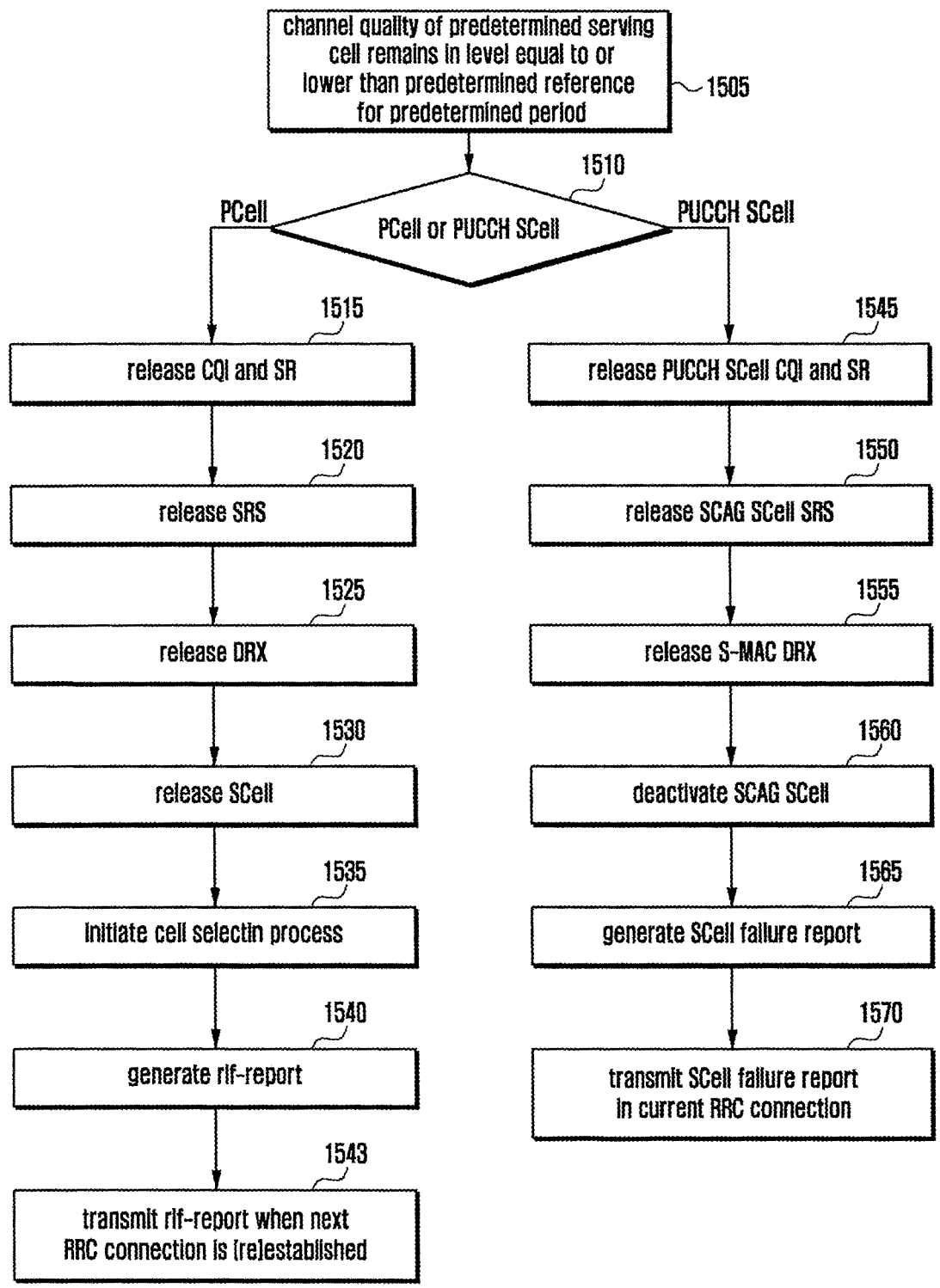
FIG. 15 is a view illustrating an operation of the UE when a channel status of the serving cell remains in a level equal to or lower than a predetermined reference for a predetermined period or more.

FIG. 15 is a view illustrating a UE operation when a channel status of the serving cell remains in a level equal to or lower than a predetermined reference for a predetermined period or more. That is, FIG. 15 illustrates a UE operation when quality of the radio link deteriorates so that it is difficult to perform normal communication.

In step 1505, the UE detects that a channel status of a predetermined serving cell meets a predetermined condition. The predetermined serving cell corresponds to the PCell or the PUCCH SCell, and it is determined that the predetermined condition is met when PDCCH quality of the serving cell remains in a level lower than a predetermined reference, for example, BLER 10% for a predetermined period. In step 1510, the UE inspects whether the serving cell in which such an event is generated, is the PCell or the PUCCH SCell. The UE proceeds to step 1515 when the serving cell is the PCell, and proceeds to step 1545 when the serving cell is the PUCCH SCell. Step 1515 is identical to step 1315. Step 1520 is identical to step 1320. Step 1525 is identical to step 1325. Step 1530 is identical to step 1330. Step 1535 is identical to step 1335. Step 1540 is identical to step 1340. Step 1543 is identical to step 1343.

Step 1545 is identical to step 1345. Step 1550 is identical to step 1350. Step 1555 is identical to step 1355. Step 1560 is identical to step 1360. Step 1565 is identical to step 1365. Step 1570 is identical to step 1440.

Figure 16:
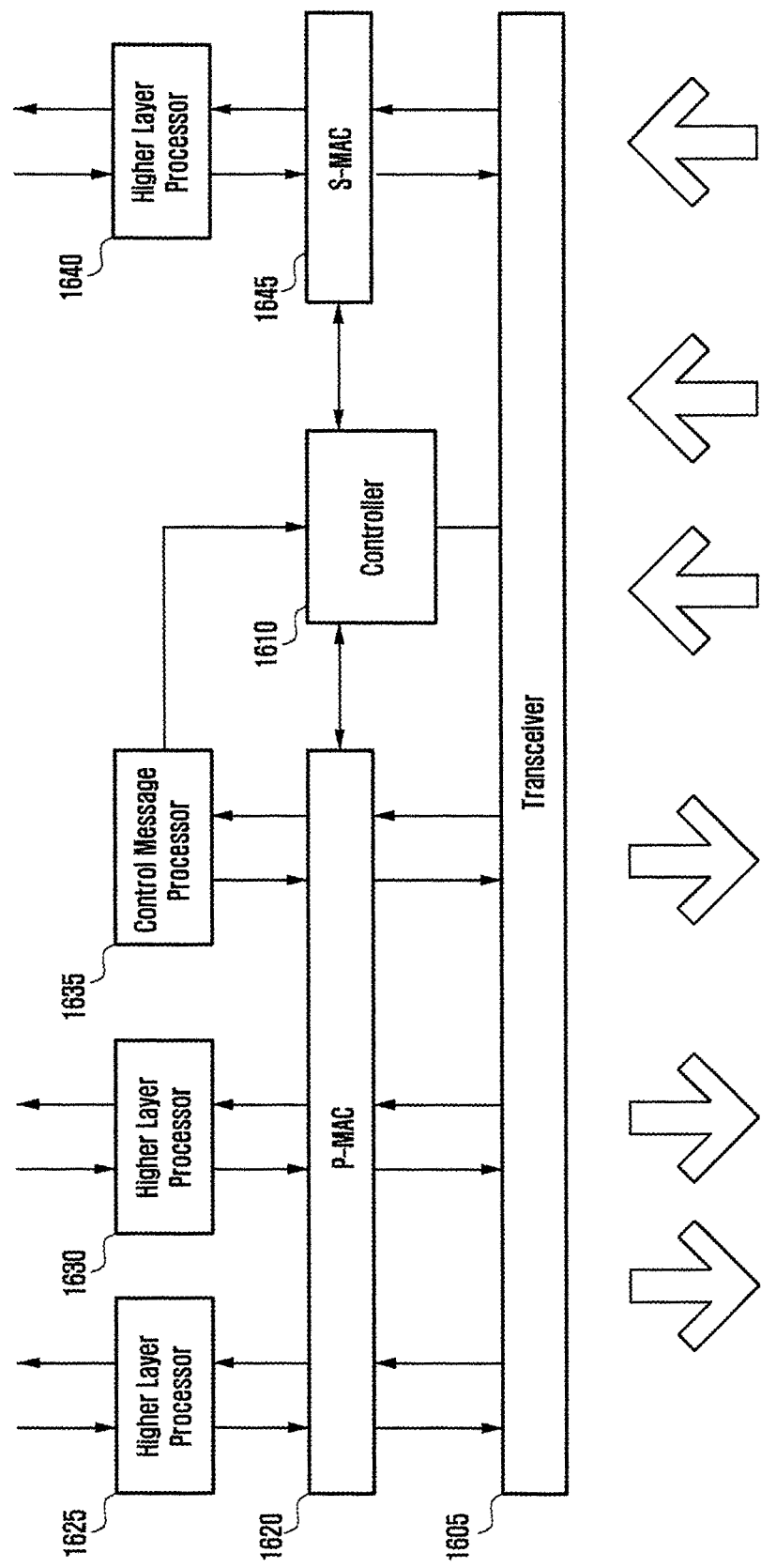
FIG. 16 is a view illustrating a UE apparatus.

FIG. 16 is a view illustrating a UE apparatus.

The UE apparatus includes a P-MAC device 1620, a control message processor 1635, various higher layer processors 1625, 1630, and 1640, a controller 1610, an S-MAC device 1645, and a transceiver 1605.

The transceiver 1605 receives data and a predetermined control signal through a downlink channel of the serving cell and transmits data and a predetermined control signal through an uplink channel. When a plurality of serving cells are set, the transceiver 1605 transmits and receives data and a control signal through the plurality of serving cells. The transceiver 1605 is connected to the P-MAC and the S-MAC through various transport channels.

The P-MAC device 1615 multiplexes data generated by the higher layer processors 1620 and 1625 or the control message processor 1630 or de-multiplexes data received by the transceiver 1605 to transfer the data to the appropriate higher layer processors 1620 and 1625 or the control message processor 1630. The P-MAC device 1615 controls operations of the BSR, PHR, and the DRX.

The control message processor 1630 is an RRC layer device, and performs a required operation by processing a control message received from the ENB. For example, the control message processor 1630 receives an RRC control message and transfers S-MAC configuration information to the controller.

The higher layer processors 1620, 1625, and 1640 may be configured according to each service. The higher layer processors 1620, 1625, and 1640 process data generated by a user service such as a FTP (File Transfer Protocol) or a VoIP (Voice over Internet Protocol) and transfers the processed data to the P-MAC or the S-MAC, or processes data transferred from the P-MAC or the S-MAC and transfers the processed data to a higher layer service application.

The controller 1610 identifies a scheduling command received through the transceiver 1605, for example, backward grants, and controls the transceiver 1605 and a multiplexing and demultiplexing unit 1615 to perform backward transmission through suitable transmission resources at an appropriate time point. The controller 1610 reconfigures the P-MAC, configures/releases (or activates/deactivates) the S-MAC, controls mapping between the P-MAC and the logical channel, controls mapping between the S-MAC and the logical channel, controls mapping between the P-MAC and the DL/UL-SCH, and controls mapping between the S-MAC and the DL/UL-SCH. The controller 1610 performs all operations related to the radio link failure or SCell failure.

Figure 17:
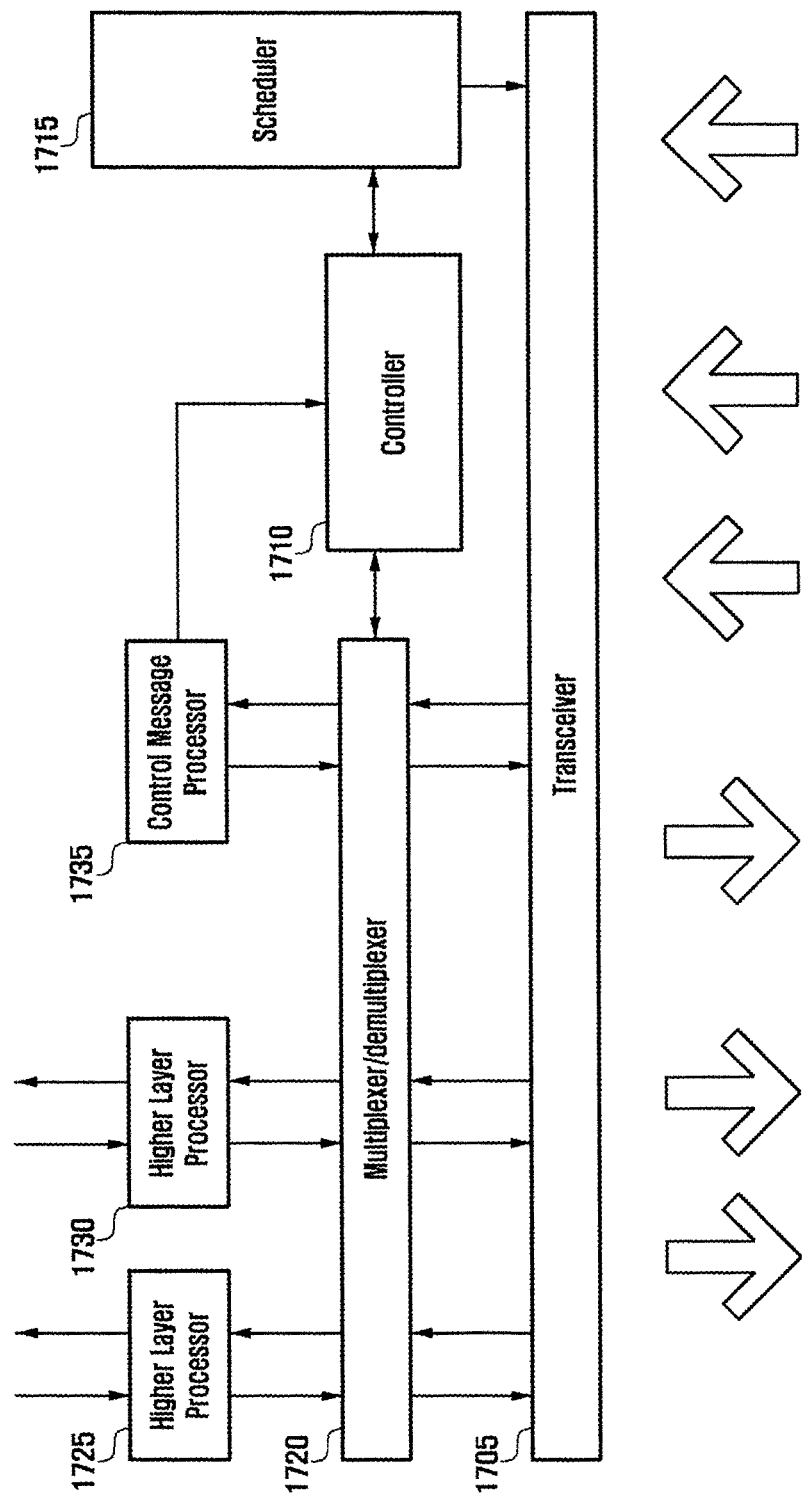
FIG. 17 is a view illustrating an ENB apparatus.

FIG. 17 is a view illustrating an ENB apparatus.

The ENB apparatus includes a transceiver 1705, a controller 1710, an MAC device 1720, a control message processor 1735, various higher layer processors 1725 and 1730, and a scheduler 1715.

The transceiver 1705 transmits data and a predetermined control signal through a forward carrier and receives data and a predetermined control signal through a backward carrier. When a plurality of carriers are set, the transceiver 1705 transmits and receives data and a control signal through the plurality of carriers.

The MAC device 1720 multiplexes data generated by the higher layer processors 1725 and 1730 or the control message processor 1735 or de-multiplexes data received by the transceiver 1705 to transfer the data to the appropriate higher layer processors 1725 and 1730, the control message processor 1735, or the controller 1710. The control message processor 1735 performs a required operation by processing a control message transmitted by the UE, or generates a control message to be transferred to the UE and transfers the generated control message to a lower layer.

The scheduler 1715 allocates transmission resources to the UE at a suitable time point in consideration of a buffer status or a channel status of the UE, and processes a signal transmitted to the transceiver 1705 by the UE or makes a control to transmit a signal to the UE.

The controller 1710 controls operations, which the ENB should perform, among the operations described in FIGS. 7 to 15.

The invention claimed is:

1. A method by a terminal in a communication system, the method comprising:
   performing a communication on at least one serving cell of a master cell group (MCG) associated with a first base station and at least one serving cell of a secondary cell group (SCG) associated with a second base station;
   determining whether a number of retransmissions of a radio link control (RLC) data for the SCG is equal to a maximum number of retransmissions;
   if the maximum number of retransmissions of the RLC data for the SCG is equal to the maximum number of retransmissions, releasing physical uplink control channel (PUCCH) and sounding reference signal (SRS) for the at least one serving cell of the SCG; and
   transmitting, to the first base station, information regarding detected radio link failure for the SCG on the at least one serving cell of the MCG,
   wherein the information further includes a measurement result of each serving cell of the SCG.

2. The method of claim 1, wherein the releasing of the PUCCH and the SRS for the serving cell of the SCG further comprises:
   releasing a discontinuous reception for the at least one serving cell of the SCG.

3. The method of claim 1, further comprising:
   determining whether a number of retransmissions of an RLC data for the MCG is equal to a maximum number of retransmissions; and
   if the maximum number of retransmissions of the RLC data for the MCG is equal to the maximum number of retransmissions, releasing PUCCH and SRS for all serving cells associated with the MCG and the SCG.

4. The method of claim 3, wherein the releasing of the PUCCH and the SRS for the all serving cells further comprises:
  releasing a discontinuous reception for the all serving cells associated with the MCG and the SCG.

5. The method of claim 3, further comprising:
  transmitting, to the first base station, information regarding radio link failure of the MCG.

6. The method of claim 5, wherein the information regarding the radio link failure of the MCG further includes at least one of a measurement result of primary cell of the MCG, an identification of the primary cell in which the MCG radio link failure is detected, and location information of the terminal.

7. A terminal in a communication system, the terminal comprising:
  a transceiver; and
  a controller configured to:
    control the transceiver to perform a communication on at least one serving cell of a master cell group (MCG) associated with a first base station and at least one serving cell of a secondary cell group (SCG) associated with a second base station;
    determine whether a number of retransmissions of a radio link control (RLC) data for the SCG is equal to a maximum number of retransmissions;
    if the maximum number of retransmissions of the RLC data for the SCG is equal to the maximum number of retransmissions, release physical uplink control channel (PUCCH) and sounding reference signal (SRS) for the at least one serving cell of the SCG; and
    control the transceiver to transmit, to the first base station, information regarding detected radio link failure for the SCG on the at least one serving cell of the MCG, wherein the information further includes a measurement result of each serving cell of the SCG.

8. The terminal of claim 7, wherein the controller is further configured to:
  release a discontinuous reception for the at least one serving cell of the SCG.

9. The terminal of claim 7, wherein the controller is further configured to:
  determine whether a number of retransmissions of an RLC data for the MCG is equal to a maximum number of retransmissions; and
  if the maximum number of retransmissions of the RLC data for the MCG is equal to the maximum number of retransmissions, release PUCCH and SRS for all serving cells associated with the MCG and the SCG.

10. The terminal of claim 9, wherein the controller is further configured to:
  release a discontinuous reception for the all serving cells associated with the MCG and the SCG.

11. The terminal of claim 9, wherein the controller is further configured to:
  control the transceiver to transmit, to the first base station, information regarding radio link failure of the MCG.

12. The terminal of claim 11, wherein the information regarding the radio link failure of the MCG further includes at least one of a measurement result of primary cell of the MCG, an identification of the primary cell in which the MCG radio link failure is detected, and location information of the terminal.

* * * * *

UNITED STATES PATENT AND TRADEMARK OFFICE
CERTIFICATE OF CORRECTION

PATENT NO. : 10,314,030 B2
APPLICATION NO. : 15/865011
DATED : June 4, 2019
INVENTOR(S) : Soenghun Kim et al.

Page 1 of 1

It is certified that error appears in the above-identified patent and that said Letters Patent is hereby corrected as shown below:

In the Claims

Column 28, Line 47, delete "maximum";

Column 28, Line 66, delete "maximum";

Column 29, Line 29, delete "maximum"; and

Column 30, Line 15, delete "maximum".

Signed and Sealed this
Eighteenth Day of August, 2020

Andrei Iancu
*Director of the United States Patent and Trademark Office*